(12) United States Patent
Torii et al.

(10) Patent No.: US 7,639,373 B2
(45) Date of Patent: Dec. 29, 2009

(54) OPTICAL DISPLACEMENT SENSOR AND OPTICAL DISPLACEMENT MEASUREMENT DEVICE

(75) Inventors: Tomonari Torii, Osaka (JP); Tomoki Hanada, Osaka (JP)

(73) Assignee: Keyence Corporation, Osaka (JP)

(*) Notice: Subject to any disclaimer, the term of this patent is extended or adjusted under 35 U.S.C. 154(b) by 142 days.

(21) Appl. No.: 11/950,200

(22) Filed: Dec. 4, 2007

(65) Prior Publication Data
US 2008/0137103 A1   Jun. 12, 2008

(30) Foreign Application Priority Data
Dec. 7, 2006   (JP)   ............ 2006-330277

(51) Int. Cl.
*G01B 11/14* (2006.01)
(52) U.S. Cl. ............... 356/614; 356/616
(58) Field of Classification Search .......... 356/614–624
See application file for complete search history.

(56) References Cited

U.S. PATENT DOCUMENTS

| | | | | |
|---|---|---|---|---|
| 6,975,408 | B2* | 12/2005 | Igaki et al. | 356/616 |
| 7,489,410 | B2* | 2/2009 | Nishio | 356/614 |
| 2003/0067613 | A1* | 4/2003 | Ishikawa et al. | 356/614 |
| 2008/0140324 | A1* | 6/2008 | Torii et al. | 702/57 |
| 2009/0141288 | A1* | 6/2009 | Nishio | 356/614 |

FOREIGN PATENT DOCUMENTS

| | | |
|---|---|---|
| JP | 2006-030094 | 2/2006 |
| JP | 2006-030095 | 2/2006 |
| JP | 2006-038571 | 2/2006 |

* cited by examiner

*Primary Examiner*—Hoa Q Pham
(74) *Attorney, Agent, or Firm*—Kilyk & Bowersox, P.L.L.C.

(57) ABSTRACT

It is an object to provide an optical displacement sensor and an optical displacement measurement device capable of improving the detection accuracy in detecting the presence or absence of a target object. An optical displacement sensor is constituted by a light projection unit for directing projected light to a target object, a light reception unit including plural light reception elements arranged in a linear shape for receiving light reflected by the target object out of the projected light L1 and outputting signals corresponding to the amount of received light, a received-light-spot detection portion for detecting a received-light spot on the light reception unit, on the basis of the outputs of the respective light reception elements, a number-of-spots determination portion for determining the number of received-light spots, on the basis of the result of the detection by the received-light-spot detection portion, a spot-position determination portion for determining a one-dimensional position at which the amount of received light is maximum, within the received-light spot, on the basis of the result of the detection by the received-light-spot detection portion, and an object detection processing portion for outputting detection signals indicative of the presence or absence of the target object, on the basis of the results of the determinations by the number-of-spots determination portion and the spot-position determination portion.

12 Claims, 23 Drawing Sheets

"PRIOR ART"

OPTICAL DISPLACEMENT SENSOR AND OPTICAL DISPLACEMENT MEASUREMENT DEVICE

CROSS-REFERENCE TO RELATED APPLICATION

The present application claims priority from Japanese Patent Application No. 2006-330277, filed on Dec. 7, 2006, the entire contents of which are hereby incorporated by reference.

BACKGROUND OF THE INVENTION

1. Field of the Invention

The present invention relates to an optical displacement sensor and an optical displacement measurement device and more particularly relates to an optical displacement sensor and an optical displacement measurement device which detect a target object on the basis of the outputs of a plurality of light reception elements for receiving light reflected by the target object when projected light is directed to the target object.

2. Description of the Related Art

As sensors for detecting the presence or absence of a target object by directing light to the target object, there have been known photoelectric sensors and optical displacement sensors. Such photoelectric sensors are sensors which determine the presence or absence of a target object, on the basis of whether or not a light reception device receives projected light emitted from a light projection. Optical displacement sensors are sensors which calculate the amount of displacement of a target object, on the basis of light reflected by the target object when projected light is directed to the target object, and determine the presence or absence of the target object, on the basis of the calculated amount of displacement.

Such optical displacement sensors are capable of determining the presence or absence of objects without being influenced by the colors and the materials of the objects, in comparison with photoelectric sensors which perform determination simply on the basis of the amount of received light, since the amount of received light detected by the light reception device is varied depending on the colors and the materials of the target objects. Further, a displacement sensor including a light reception device constituted by a plurality of light reception elements arranged in a linear shape for receiving light reflected by a target object determines a one-dimensional position of the received-light spot on the light reception device, on the basis of the amount of light received by the respective light reception elements (for example, shown in Japanese Published Patent No. 2006-38571). For example, the distribution of the amount of light obtained by the light reception elements in the direction of the arrangement of the respective light reception elements is obtained and the peak position on the distribution of the amount of light is determined as the position of the received-light spot. The amount of displacement of a target object is calculated on the basis of the determination of the position of the received-light spot obtained in such a manner.

An optical displacement sensor as described above determines the position of a received-light spot on the basis of the distribution of the amount of light obtained from a plural of light reception elements, which can reduce the error caused by the condition of the surface of the target object, in comparison with sensors which employ PSDs (Position Sensitive Devices) for detecting the position of the barycenter of the amount of received light. For example, even when the target object has a mirror surface and the sensor itself is reflected by the object surface or when the object has a shiny surface and the projected light is irregularly reflected by the object surface thereby distorting the distribution of the amount of light and deviating the position of the barycenter of the amount of received light, the aforementioned optical displacement sensor is capable of correctly detecting the presence or absence of the object.

FIG. 18 is a view illustrating the structure of a conventional optical displacement sensor 100, schematically illustrating a state where projected light emitted from a light projection unit 101 is received by a light reception unit 104. The optical displacement sensor 100 is constituted by the light projection unit 101, and the light reception unit 104 constituted by a light reception lens 102 and a light reception device 103. The light reception unit 103 is an image pickup device including a plurality of light reception elements placed in a linear shape for receiving the reflected light from the work 120, and the respective light reception elements output signals corresponding to the amount of received light. The light emitted from the light projection unit 101 and directed to the work 120 is reflected by the work 120 and is converged at a position on the light reception device 103 which is varied depending on the height of the irradiation point on the work 120, namely the position of the irradiation point in the direction of the optical axis of the projected light. The displacement sensor 100 determines a one-dimensional position of the received-light spot on the aforementioned light reception unit 103 on the basis of the outputs of the respective light reception elements and calculates the amount of displacement of the work 120 on the basis of the result of the determination.

FIG. 19 is a view illustrating amount of light received by the respective light reception elements in the optical displacement sensor 100, designating the position on the light reception unit 103 along the horizontal axis while designating the amount of received light along the vertical axis. The curve 131 is a curve indicating a distribution of the amount of received light obtained when the projected light is reflected by the work bench 110, indicating a mound-shaped distribution having a maximum amount of received light at a posi tional. The curve 132 is a curve indicating a distribution of the amount of received light obtained when the projected light is reflected by a work 120, indicating a distribution having a position at which the amount of received light is peaked (position a2) at the position which is left of the curve 131. The spread of the mound-shaped distribution indicates the size of the received-light spot, and the peak position indicates the position of the received-light spot. The procedure for detecting the presence or absence of the work 120 is as follows. At first, a peak position a2 obtained when the work 120 exists on the work bench 110 and a peak positional obtained when the work 120 does not exists on the work bench 110 are determined, and a threshold value a3 is defined between these peak positions. Then, in actual operation, a peak position determined on the basis of the distribution of the amount of received light, namely the position of the received-light spot, is compared with the threshold value a3 and, on the basis of the result of the comparison, the determination of the presence or absence of the work 120 is performed.

FIG. 20 is a view illustrating the optical displacement sensor 100 placed in a manufacturing line. The displacement sensor 100 is used for detecting the presence or absence of works 120 being transferred in the direction of the line along the work bench 110. In this case, when a work 120 exists at a position beneath the displacement sensor 100 to which the projected light is directed, the peak position in the distribution of the amount of received light is different from the peak position when no work 120 exists at the position. The displacement sensor 100 detects the presence or absence of a work 120, utilizing the fact that the peak position in the distribution of the amount of received light, namely the amount of displacement of the work 120, is varied depending on whether or not the work 120 exists.

FIG. 21 is a timing chart illustrating operations of the optical displacement sensor 100 for detection of works, illustrating detected values of amounts of displacements and sensor outputs indicative of the presence or absence of work 120. The detected value of the amount of displacement is the distance to the irradiation point in the direction of the optical axis of the projected light and is calculated on the basis of the peak position in the distribution of the amount of received light. The detected value of the amount of displacement (the distance b2) acquired when a work 120 exists is smaller than the detected value (the distance b1) when no work 120 exists. The threshold value b3 is a threshold value for use in determining the presence or absence of a work 120 and corresponds to the threshold value a3 regarding the position of the received-light spot (b2<b3<b1). If the detected value of the amount of displacement is decreased to below the threshold value b3, the sensor output is turned on, and the voltage level thereof is switched from a low level to a high level. Further, if the detected value of the amount of displacement is increased to above the threshold value b3, the sensor output is turned off, and the voltage level thereof is switched from the high level to the low level. The displacement sensor 100 determines the presence or absence of a work 120, by making a comparison between the position of the received-light spot, namely the amount of displacement of the work 120, and the threshold value, as described above.

SUMMARY OF THE INVENTION

When works having a highly reflective or a shiny surface are detected, there have been cases where the projected light is irregularly reflected due to the fluttering or the surface shapes of the works, thereby distorting the distribution of the amount of received light. In this case, it has been impossible to detect the position of the received-light spot. Otherwise, the position of the received-light spot may be incorrect even if it can be determined, in many cases. Therefore, conventional technologies try to solve the problem which is the determination of the correct position of the received-light spot. However, various kinds of the received-light spot at an incorrect position can be appeared, the problem is still remaining. Consequently, the received-light spot at an incorrect position leads the conventional sensor to calculate an incorrect displacement amount. The incorrect displacement amount has induced to mistake the detecting the presence or absence of works.

FIG. 22 is a view illustrating an optical displacement sensor 100 for detecting a work 121 having shiny placed on a work bench 110. The work 121 is a target object having a shiny surface or a surface having a complicated shape. Projected light is emitted from a light projection unit 101 and is irregularly reflected by the work 121. More specifically, reflected light 141 resulted from the reflection of the projected light at the irradiation point on the work 121 and reflected light 142 resulted from re-reflection at a point on the work 121 which is deviated from the irradiation point are received by a light reception unit 104. In this case, the distribution of the amount of received light is largely distorted due to the influence of the multiple reflections of the projected light.

FIG. 23 is a view illustrating the amount of light received by the respective light reception elements in the optical displacement sensor 100, illustrating a curve 143 indicating a distribution of the amount of received light. The curve 143 has two points at which the amount of received light is a local maximum, thus forming peak positions a11 and a12. If the distribution of the amount of received light is largely distorted as described above, this makes it impossible to identify correctly the position of the received-light spot. Particularly, the projected light is irregularly reflected by the work 121, which makes it difficult to identify the position of the received-light spot from the magnitude of the amount of the received light at the local maximum points and the positional relationship between the respective local maximum points. In other words, an incorrect position of the received-light spot may be identified based on the magnitude of the amount of the received light or the positional relationship. Accordingly, the conventional optical displacement sensor 100 has induced to detect an incorrect displacement amount of works based on the incorrect position of the received-light spot.

In view of the above-mentioned circumstances, an object of the present invention is to provide an optical displacement sensor and an optical displacement measurement device capable of improving the detection accuracy in detecting the presence or absence of target objects. Particularly, the present invention aims at providing an optical displacement sensor capable of correctly detecting the presence or absence of objects, even when the target objects have a highly reflective or a shiny surface. Further, the present invention aims at providing an optical displacement sensor capable of detecting the occurrence of distortion in the distribution of the amount of received light obtained by a plurality of light reception elements arranged in a straight line.

An optical displacement sensor according to a first embodiment includes a light projection unit for directing projected light to a target object; a light reception unit including two or more light reception elements arranged in a linear shape for receiving light reflected by the target object from the aforementioned projected light, and outputting signals corresponding to the amount of received light; a received-light-spot detection unit for detecting a received-light spot on the light reception unit, on the basis of the outputs of the respective light reception elements; a number-of-spots determination unit for determining the number of the received-light spots, on the basis of the result of the detection by the received-light spot detection unit; and an object detection unit for determining the presence or absence of the target object on the basis of the result of the determination by the number-of-spots determination unit, and outputting detection signals indicative of the result of the determination.

The optical displacement sensor detects a received-light spot on the light reception unit on the basis of the outputs of the respective light reception elements and determines the number of received-light spots on the basis of the result of the detection. Further, the optical displacement sensor determines the presence or absence of a target object on the basis of the result of the determination of the number of spots and outputs detection signals indicative of the result of the determination. With this structure, it is possible to determine the presence or absence of a target object and output detection signals on the basis of the number of detected received-light spots, thereby correctly detecting the presence or absence of the target object, even when the target object has a highly reflective or a shiny surface.

An optical displacement sensor according to a second embodiment includes, in addition to the aforementioned structure, a spot-position determination unit for determining a one-dimensional position of the aforementioned received-light spot on the basis of the result of the detection by the aforementioned received-light spot detection unit, wherein the aforementioned object detection unit determines the presence or absence of a target object, on the basis of the result of the determination by the spot-position determination unit, when the number of received-light spots is one. With this structure, it is possible to determine the presence or absence of the target object on the basis of the number of received-light spots and the one dimensional position thereof, thereby further improving the detection accuracy in detecting the presence or absence of the object.

An optical displacement sensor according to a third embodiment is structured, in addition to the aforementioned structure, such that, when the number of received-light spots is one and the one-dimensional position of the received-light spot falls within a predetermined range, the aforementioned object detection unit outputs detection signals different from those in other cases.

An optical displacement sensor according to a fourth embodiment is structured, in addition to the aforementioned structure, such that the aforementioned spot-position determination unit determines the width of the received-light spot and, when the number of received-light spots is one, the one-dimensional position of the received-light spot falls within a predetermined range and the width of the received-light spot falls within a predetermined range, the aforementioned object detection unit outputs detection signals different from those in other cases. With this structure, it is possible to output detection signals on the basis of the number of received-light spots and the one-dimensional positions and the widths thereof, thereby further improving the detection accuracy in detecting the presence or absence of the object.

An optical displacement sensor according to a fifth embodiment includes, in addition to the aforementioned structure, an amount-of-displacement display unit for calculating the amount of displacement of the target object on the basis of the result of the determination by the spot-position determination unit and displaying the result of the calculation, and a multiple-reflection display unit for displaying the presence or absence of multiple reflections caused by the target object to distinguish the presence or absence of multiple reflections, on the basis of the result of the determination by the aforementioned number-of-spots determination unit. With this structure, it is possible to display the presence or absence of multiple reflections caused by the target object to distinguish the presence or absence of multiple reflections, on the basis of the number of detected received-light spots, which enables the user to recognize whether or not the distribution of light obtained by the plural light reception elements arranged in a linear shape is distorted. Accordingly, in cases of constantly displaying the amount of displacement of the target object as a measurement value, it is possible to enable the user to recognize whether or not multiple reflections occur.

An optical displacement sensor according to a sixth embodiment is structured, in addition to the aforementioned structure, the multiple-reflection display unit displays an indication representing that the number of received-light spots is one, which is different from an indication representing that the number of received-light spots is not one.

An optical displacement sensor according to a seventh embodiment is structured, in addition to the aforementioned structure, such that the spot-position determination unit determines the width of the received-light spot, on the basis of the outputs of the respective light reception elements, and, the multiple-reflection display unit displays an indication representing that the number of received-light spots is one and the width of the received-light spot falls within a predetermined range, which is different from an indication that the number of received-light spots is not one or the width of the received-light spot does not fall within a predetermined range.

An optical displacement measurement device according to an eighth embodiment includes a light projection unit for directing projected light to a target object; a light reception unit including two or more light reception elements arranged in a linear shape for receiving light reflected by the target object from the projected light, and outputting signals corresponding to the amount of received light; a received-light spot detection unit for detecting a received-light spot on the light reception unit, on the basis of the outputs of the respective light reception elements; a number-of-spots determination unit for determining the number of the received-light spots, on the basis of the result of the detection by the received-light spot detection unit; a spot-position determination unit for determining a one-dimensional position of the received-light spot at which the amount of received light is maximum, on the basis of the result of the detection by the received-light spot detection unit; an object detection unit for determining the presence or absence of the target object on the basis of the result of the determination by the number-of-spots determination unit and outputting detection signals indicative of the result of the determination; an amount-of-displacement calculation unit for calculating the amount of displacement of the target object, on the basis of the result of the determination by the spot-position determination unit; and a mode switching unit for switching, on the basis of the user's operations, between a sensor mode in which the detection signals are an output on the basis of the position of a reference point specified by a user and a measurement mode in which the result of the calculation by the amount-of-displacement calculation unit is an output on the basis of a threshold value defined between two reference points specified by the user.

An optical displacement measurement device according to a ninth embodiment is structured, in addition to the aforementioned structure, such that the spot-position determination unit determines the width of the received-light spot on the basis of the outputs of the respective light reception elements, and the amount-of-displacement calculation unit calculates the amount of displacement, when the number of received-light spots is one and the width of the received-light spot falls within a predetermined range.

An optical displacement measurement device according to a tenth embodiment includes, in addition to the aforementioned structure, an amount-of-displacement storage unit for storing the amount of displacement calculated by the amount-of-displacement calculation unit, and an amount-of-displacement updating unit for selecting one of the results of the calculation by the amount-of-displacement calculation unit and the amount of displacement read from the amount-of-displacement storage unit, on the basis of the result of the determination by the number-of-spots determination unit, and rewriting the content of the amount-of-displacement storage unit, if a detection result of a received-light spot is newly obtained.

An optical displacement measurement device according to an eleventh embodiment includes, in addition to the aforementioned structure, a reference-point specification unit for specifying the reference point(s) on the basis of the user's operations, and a reference-specification invalidation unit for invalidating the reference point(s) specified by the reference-point specification unit, when two or more received-light spots exist.

With the optical displacement sensor and the optical displacement measurement device according to the present invention, it is possible to determine the presence or absence of a target object on the basis of the number of detected received-light spots, thereby correctly detecting the presence or absence of the object and improving the detection accuracy in detecting the presence or absence of the object, even when the target object has a highly reflective or a shiny surface. Further, it is possible to display the presence or absence of multiple reflections caused by the target object to distinguish the presence or absence of multiple reflections, on the basis of the number of detected received-light spots, which enables the user to recognize whether or not the distribution of light obtained by the plural light reception elements arranged in a linear shape is distorted.

DETAILED DESCRIPTION OF THE PREFERRED EMBODIMENTS

Figure 1:
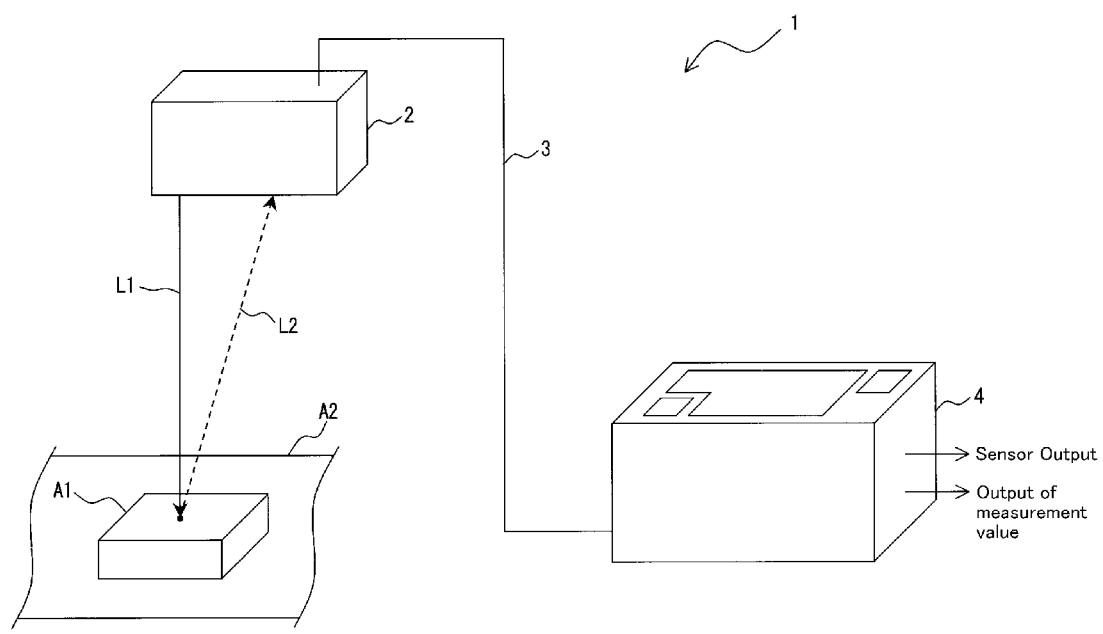
FIG. 1 is an external view illustrating an exemplary schematic structure of an optical displacement sensor according to an embodiment of the present invention, illustrating an optical displacement measurement device 1 for detecting the presence or absence of a work A1.

FIG. 1 is a perspective view illustrating an exemplary schematic structure of an optical displacement sensor according to an embodiment of the present invention, illustrating, as an exemplary optical displacement sensor, an optical displacement measurement device 1 for detecting the presence or absence of a work A1 (a "target object" can be also identified as a "work", hereinafter), on the basis of reflected light L2 resulting from the irradiation of projected light L1. The optical displacement measurement device 1 is a detection device constituted by a head unit 2, a transmission cable 3 and a main-body unit 4 and detects the work A1 placed on a work bench A2.

The head unit 2 is a rectangular-parallelepiped-shaped unit which includes a light projection device for directing projected light L1 to the work A1 and a light reception device for receiving the light L2 reflected by the work A1 from the projected light L1 and adjusts the output of the light projection device on the basis of the output of the light reception device. The head unit 2 is placed on, for example, a manufacturing line for the work A1 and can emit the projected light L1 in just the downward direction.

The transmission cable 3 is a cable for supplying electric power to the head unit 2, for transmitting the output of the light reception device to the main-body unit 4 and for transmitting control signals from the main-body unit 4 to the head unit 2.

The main-body unit 4 is a unit which detects the received-light spot on the light reception device and, on the basis of the result of the detection, determines the presence or absence of the work A1 and calculates the amount of displacement thereof. On one surface of the case of the main-body unit 4, there are placed various types of operation keys and a display portion for displaying the presence or absence of the work A1 and the result of measurements.

The optical displacement measurement device 1 can be switched between a sensor mode in which detection signals indicative of the presence or absence of a work A1 are outputted as sensor outputs and a measurement mode in which results of calculations of amounts of displacements are outputted as measurement values, on the basis of the user's operations. Further, detection of a received-light spot based on the output of the light reception unit is performed at predetermined time intervals or performed by using, as triggers, timing signals inputted from an external apparatus such as a PLC (Programmable Logic Controller) which is not illustrated.

Figure 2:
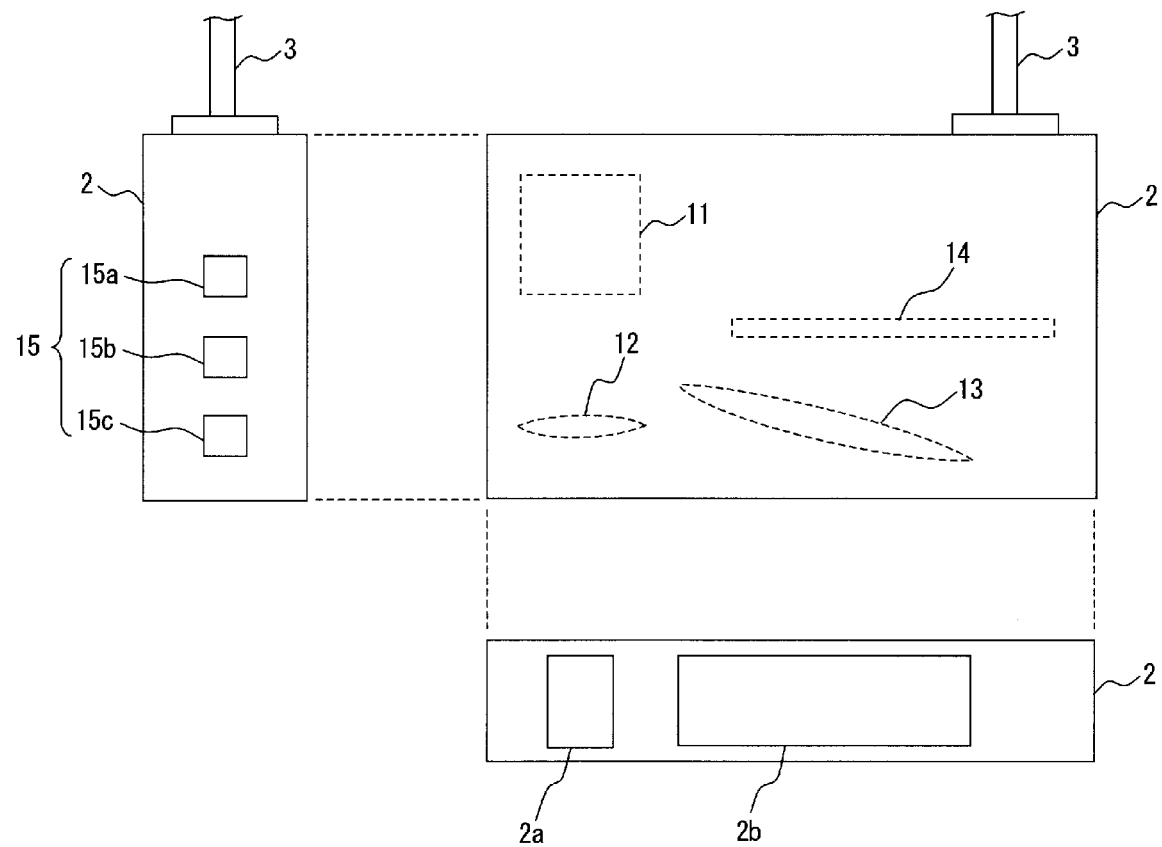
FIG. 2 is an external view of an exemplary structure of a head unit 2 in the optical displacement measurement device 1 of FIG. 1.

FIG. 2 is an external view illustrating an exemplary structure of the head unit 2 in the optical displacement measurement device 1 of FIG. 1. This head unit 2 includes a light projection device 11, a light projection lens 12, a light reception lens 13 and a light reception device 14 within a case, and a head indicator 15, constituted by LED indicating lights 15a to 15c, is placed on a side surface of the case.

The light projection device 11 is a light-source device for creating the projected light L1 and is constituted by a light emitting device such as an LD (laser diode) and the like. The light projection lens 12 is a condenser lens for converging the projected light L1 emitted from the light projection device 11 and is placed at a position closer to the work A1 than the light projection device 11. The projected light L1 passed through the light projection lens 12 is directed to the work A1 through a rectangular-shaped light projection window 2a provided in the front surface of the case.

The light reception lens 13 is a condenser lens for converging, onto the light reception device 14, the light L2 reflected by the work A1 when the projected light L1 is directed to the work A1, wherein the reflected light L2 enters the light reception lens 13 through a light reception window 2b provided in the front surface of the case. The light reception device 14 is an image pickup device constituted by a plurality of light reception elements placed in a linear shape for receiving the reflected light L2 from the work A1, and the respective light reception elements output signals corresponding to the amount of the received light. More specifically, a line CCD (Charge Coupled Device) constituted by a plurality of PDs (photo diodes) placed along a straight line is used as the light reception device 14.

The light emitted from the light projection device 11 and directed to the work A1 is reflected by the work A1 and is converged at a position on the light reception device 14 which is varied depending on the height of the irradiation point on the work A1, namely the distance to the irradiation point from the work bench A2. Also, it is possible to employ, as the light reception device 14, an image pickup device constituted by a plurality of light reception elements placed in a plane shape, provided that the change of the position of the received-light spot on the light reception device 14 caused by the change of the height of the irradiation height can be determined therewith.

In general, when the projected light L1 is directed in just the downward direction, if the height of the irradiation point is changed, this will change the incident angle of the reflected light L2 with respect to the light reception lens 13. In such a case, by placing the light reception lens 13 and the light reception device 14 such that the plane including the main surface of the light reception lens 13 and the straight line indicative of the direction of arrangement of the light reception elements in the light reception device 14 are intersected with each other on the optical axis of the projected light L1, it is possible to cause the reflected light L2 to form an image on the light reception device 14, due to the Scheimpflug principle.

The LED indicating light 15a is an indicating light indicative of the state of the output of the projected light L1 and is constituted by an LED (Light Emitting Diode). The LED indicating light 15a is lighted in a green color during irradiation of the projected light L1, but is turned off during non-irradiation, for example. The LED indicating light 15b is an indicating light indicative of the state of the output of a sensor in the main-body unit 4 and is turned off when the sensor output is at an ON state, but is lighted in a red color when the sensor output is at an OFF state, for example.

The LED indicating light 15c is an indicating light indicative of the presence or absence of multiple reflections on the work A1 and is lighted in a green color when the reflected light L2 from the work A1 contains light caused by multiple reflections, but is turned off when it does not contain light caused by multi reflection, for example.

Figure 3:
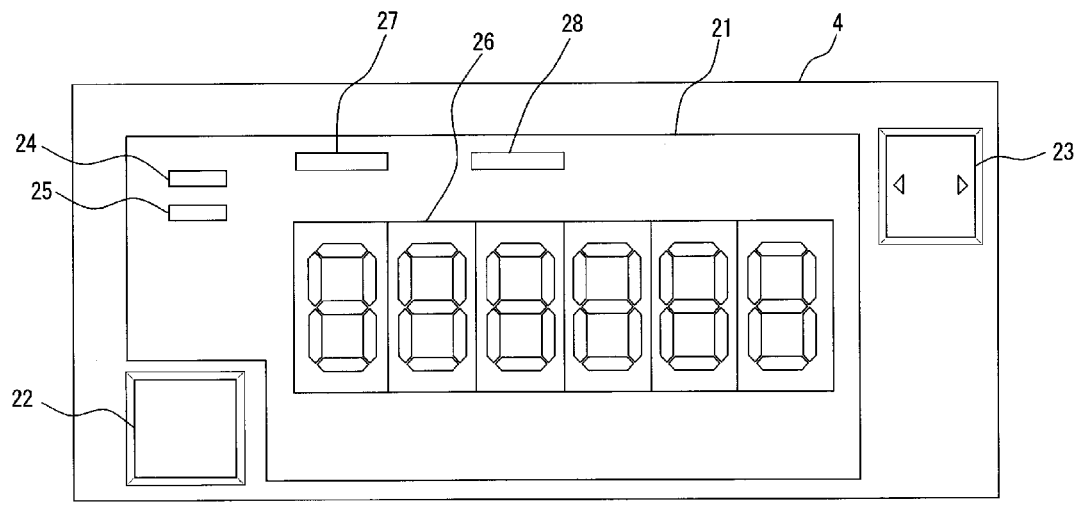
FIG. 3 is a top view of an exemplary structure of a main-body unit 4 in the optical displacement measurement device 1 of FIG. 1.

FIG. 3 is an external view illustrating an exemplary structure of the main-body unit 4 in the optical displacement measurement device 1 of FIG. 1, illustrating the state of a side surface of the case which is provided with a display portion 21, a set key 22 and a direction key 23. The display portion 21 is constituted by various types of LED indicating lights 24, 25, 27 and 28 and a 7-segment LED display portion 26. The LED indicating light 24 is an indicating light indicative of the state of the output of the projected light L1 and is constituted by an LED (Light Emitting Diode) The LED indicating light 24 is lighted in a green color during irradiation of the projected light L1, but is turned off during non-irradiation, for example.

The LED indicating light 25 is an indicating light indicative of the state of the output of the sensor in the main-body unit 4 and is turned off when the sensor output is at an ON state, but is lighted in a red color when the sensor output is at an OFF state, for example. The LED indicating light 27 is an indicating light indicative of whether or not the operation mode is the sensor mode and is lighted when the operation mode is the sensor mode, but is turned off when it is not the sensor mode, for example.

The LED indicating light 28 is an indicating light indicative of the presence or absence of multiple reflections caused by the work A1 and is lighted in a green color when the reflection by the work A1 contains multiple reflections, but is turned off when it contains no multiple reflections, for example.

The 7-segment LED display portion 26 is a display device for displaying characters indicative of the result of detection of the amount of displacement and is constituted by six 7-segment LEDs placed at the center of the display portion 21. The respective 7-segment LEDs are arranged in the longitudinal direction of the side surface of the case.

The set key 22 is an operation key for specifying a reference point for use in determining the presence or absence of a work A1 and in calculating the amount of displacement and is placed at the left end portion of the case side surface. In this case, two types of operation inputs, which are normal push and long push, can be performed with the set key 22, and inputs are performed according to the operation methods. The normal push is an operation method for ending an inputting operation (an input-on state) before the elapse of a predetermined time period (for example, 2 seconds). On the other hand, the long push is an operation method for maintaining an inputting operation (an input-on state) beyond a predetermined time period (for example, 3 seconds). The direction key 23 is an operation key for changing over the operation mode and is placed at the right end portion of the case side surface.

Figure 4:
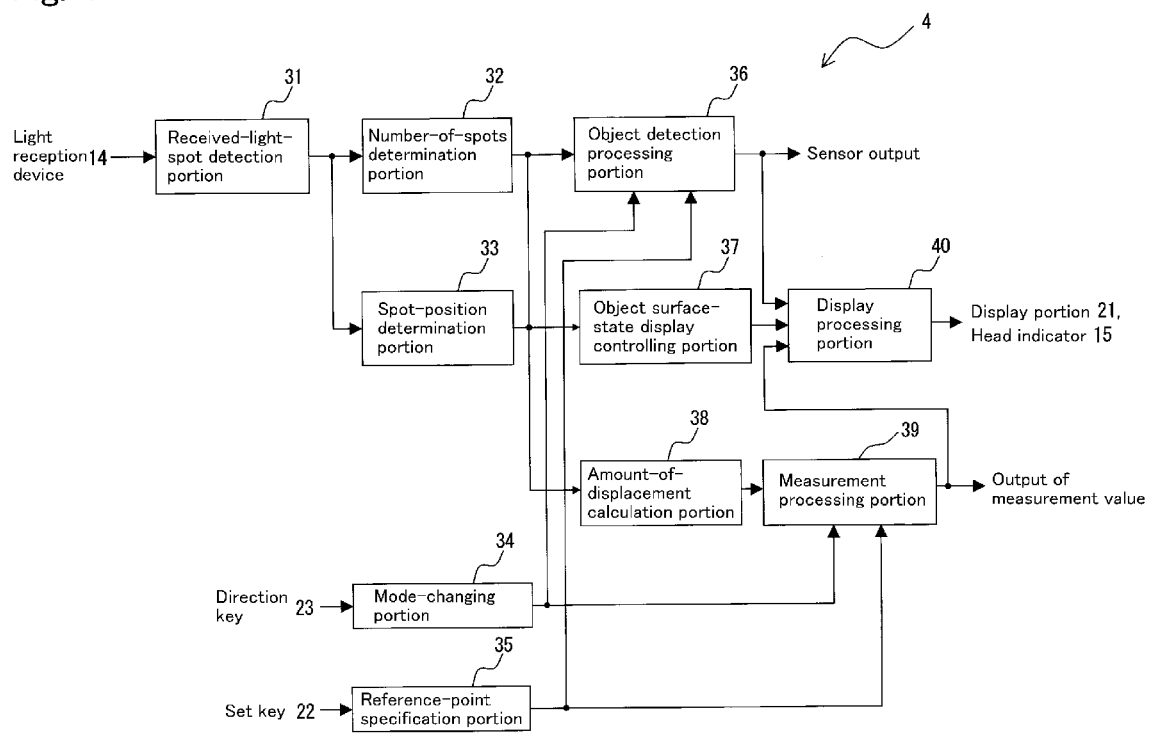
FIG. 4 is a block diagram illustrating an exemplary structure of the main parts of the optical displacement measurement device 1 of FIG. 1, illustrating an exemplary functional structure of the main-body unit 4.

FIG. 4 is a block diagram illustrating an exemplary structure of main parts of the optical displacement measurement device 1 of FIG. 1, illustrating an exemplary functional structure in the main-body unit 4. The main-body unit 4 is constituted by a received-light-spot detection portion 31, a number-of-spots determination portion 32, a spot-position determination portion 33, a mode-changing portion 34, a reference-point specification portion 35, an object detection processing portion 36, an object surface-state display controlling portion 37, an amount-of-displacement calculation portion 38, a measurement processing portion 39 and a display processing portion 40.

The received-light-spot detection portion 31 performs operations for detecting a received-light spot on the light reception unit 14, on the basis of the outputs of the respective light reception elements in the light reception unit 14. More specifically, the amount of received light detected by the respective light reception elements are determined, and a received-light spot is extracted from the one-dimensional distribution of the amount of received light in the direction of the arrangement of the light reception elements. For example, a one-dimensional area in which the amount of received light exceeds a predetermined threshold value T1 is extracted as a received-light spot. In other words, a continuous area in which the amount of received light exceeds the predetermined threshold value T1 is extracted as a received-light spot, out of the group of the light reception elements adjacent to one another. Further, if there is a area in which the amount of received light does not exceed the threshold value T1 between continuous areas in which the amount of received light exceeds the predetermined threshold value T1, the continuous areas would be extracted as the received-light spots respectively.

The number-of-spots determination portion 32 performs operations for determining the number of received-light spots, on the basis of the result of the detection by the received-light spot determination portion 31. The spot-position determination portion 33 performs operations for determining a one-dimensional position at which the amount of received light is a local maximum, within the received-light spot, on the basis of the result of the detection by the received-light-spot detection portion 31. More specifically, the position at which the amount of received light is a local maximum, namely the peak position, is determined, out of the one-dimensional area extracted as a received-light spot from the one-dimensional distribution of the amount of received light. In this case, the peak position determined as described above will be referred to as the position of the received-light spot.

The spot-position determination portion 33 determines whether or not the position of the received-light spot falls within a predetermined range and also determines the width of the received-light spot, namely the length of the one-dimensional area extracted as a received-light spot from the one-dimensional distribution of the amount of received light, on the basis of the result of the detection by the received-light-spot detection portion 31.

The object detection processing portion 36 performs processing for creating detection signals indicative of the presence or absence of a work A1, on the basis of the results of the determinations by the number-of-spots determination portion 32 and the spot-position determination portion 33, when the operation mode is the sensor mode. More specifically, if the number of received-light spots extracted from the one-dimensional distribution of the amount of received light is 0, 2 or more, it is determined that a work A1 exists. If the number of received-light spots is one, a reference is made to the result of the determination of the position of the received-light spot and, if the position of the received-light spot does not fall within the predetermined range, it is determined that a work A1 exists. If the number of received-light spots is one and, also, the position of the received-light spot falls within the aforementioned predetermined range, a reference is made to the result of the determination of the width of the received-light spot and, if the width of the received-light spot does not fall within a predetermined range, it is determined that a work A1 exists. On the other hand, if the number of received-light spots is one, the position of the received-light spot falls within the predetermined range, and the width of the received-light spot falls within the predetermined range, it is determined that no work A1 exists.

In this case, the processing for determining the number of received-light spots is performed in preference to the processing for determining the position of the received-light spot and the processing for determining the width thereof. Namely, the processing for determining the position and the processing for determining the width are performed only when the number of received-light spots is one, but, when the number of received-light spots is not one, the determination of the presence or absence of a work A1 is performed, without performing the processing for determining the position and the processing for determining the width. Further, the processing for determining the position of the received-light spot is performed in preference to the processing for determining the width of the received-light spot. That is, only when the position of the received-light spot falls within the predetermined range, a reference is made to the result of the determination of the width, but, when the position of the received-light spot does not fall within the predetermined range, the determination of the presence or absence of a work A1 is performed, without referring to the result of the determination of the width.

Detection signals indicative of the presence or absence of a work A1 are outputted as state signals having two different voltage levels, for example, and the voltage level of detection signals is switched therebetween on the basis of the result of the determination of the presence or absence of a work A1. More specifically, if it is determined that a work A1 exists, the detection signals are turned on, and the voltage level thereof is switched from a low level to a high level. On the other hand, if it is determined that no work A1 exists, the detection signals are turned off, and the voltage level thereof is switched from the high level to the low level.

In the present embodiment, when the number of received-light spots is one, the position of the received-light spot falls within the predetermined range and also the width of the received-light spot falls within the predetermined range, detection signals having a voltage level different from that of detection signals in other cases are outputted. Also, when the number of received-light spots is one and the position of the received-light spot falls within the predetermined range, detection signals different from those in other cases can be output, without performing the processing for determining the width of the received-light spot. Also, when the number of received-light spots is one, detection signals different from those in other cases can be output, without performing the processing for determining the position of the received-light spot and the processing for determining the width of the received-light spot.

On the other hand, when the operation mode is the measurement mode, the object detection processing portion 36 performs processing for creating detection signals indicative of the presence or absence of a work A1, on the basis of the results of the determinations by the number-of-spots determination portion 32 and the spot-position determination portion 33, similarly to when the operation mode is the sensor mode, but the details of the processing are different therefrom. Namely, in the measurement mode, when the number of received-light spots is one and the width of the received-light spot falls within a predetermined width range, it is determined that the detection is normal. On the other hand, if the number of received-light spots is 0, 2 or more, or the width of the received-light spot does not fall within the predetermined width range, it is determined that the detection is abnormal.

If it is determined that the detection is normal, detection signals indicative of the presence or absence of a work A1 are created, according to whether or not the position of the received-light spot falls within a predetermined range. On the contrary, if it is determined that the detection is abnormal, detection signals are created, according to whether or not the position of a received-light spot obtained by a nearest preceding normal detection falls within the predetermined range.

The object surface-state display controlling portion 37 is a multiple-reflection display controlling means for controlling the display processing portion 40 on the basis of the results of the determinations by the number-of-spots determination portion 32 and the spot-position determination portion 33 to cause it to display the presence or absence of multiple reflections caused by the work A1 to distinguish the presence or absence of multiple reflections. In this case, "multiple reflections" displayed by the spot-position determination portion 33 can be defined as the multiple reflections literally. The "multiple reflections" displayed by the spot-position determination portion 33 can include not only the multiple reflections literally, but also at least one of a no-reflection condition and a warped-shape spot condition. In detail, the no-reflection condition includes, for example, a condition where the number of received-light spots is 0 since the projected light L1 is reflected on a shiny surface of a work A1 to a different position from the position of the light reception unit 14. The warped-shape spot condition includes, for example, a condition where the width of the received-light spot does not fall within the predetermined width range since the projected light is reflected diffusely on a high reflective surface of a work A1.

More specifically, when the number of received-light spots is 0, 2 or more, and when the number of received-light spots is one but the width of the received-light spot does not fall within the predetermined range, it is determined that multiple reflections occur, but in other cases it is determined that no multiple reflections occur. On the basis of the result of the aforementioned determination, displaying is performed according to the state of the surface of the work A1. For example, the LED indicating light 28 in the display portion 21 and the LED indicating light 15c in the head unit 2 are lighted in different lighting states or in different colors, according to the presence or absence of multiple reflections.

Also, when the number of received-light spots is 0, 2 or more, the LED indicating lights 29 and 15c can be lighted in lighting states or in colors different from those of when the number of received-light spots is one, without referring to the result of the determination of the width of the received-light spot. Also, only in cases where the number of received-light spots is 2 or more, which do not include cases where the reflected light is not received, it is determined that multiple reflections occur and, when the number of received-light spots is 2 or more, the LED indicating lights 29 and 15c can be lighted in lighting states or in colors different from those of when the number of received-light spots is one.

The amount-of-displacement calculation portion 38 performs processing for calculating the amount of displacement of the work A1, on the basis of the results of the determinations by the number-of-spots determination portion 32 and the spot-position determination portion 33. In this case, the processing for calculating the amount of displacement is performed when the number of received-light spots is one and the width of the received-light spot falls within the predetermined range, but in other cases the processing for calculating the amount of displacement is not performed. That is, the processing for calculating the amount of displacement is performed only when no multiple reflections occur.

The measurement processing portion 39 performs operations for outputting the result of the calculation of the amount of displacement by the amount-of-displacement calculation portion 38, as a measurement value. The display processing portion 40 performs processing for causing the display portion 21 in the main-body unit 4 and the head indicator 15 in the head unit to display the sensor output, the output of the measurement value, and the presence or absence of multiple reflections, according to the operation mode.

The mode changing portion 34 performs processing for switching the operation mode between the sensor mode and the measurement mode, on the basis of the user's operations on the direction key 23. The reference-point specification portion 35 performs processing for specifying reference points for use in detecting the presence or absence of a work A1 and calculating the amount of displacement, on the basis of user's operations on the direction key 22.

In the sensor mode, the position of a received-light spot obtained at the timing of a normal push of the set key 22 is set as a reference point. Usually, the normal push of the set key 22 is performed at a state where no work A1 exists on the work bench A2. Subsequent to the operation, the position of a received-light spot obtained at the timing of a long push of the set key 22 at a state where a work A1 exists on the work bench A2 is set as a reference point. On the basis of the positions of the two reference points obtained as described above, a threshold value for use in determining the presence or absence of a work A1 are automatically defined between the two reference points.

In this case, two threshold values T21 and T22 which define a range symmetrical with respect to a reference point in the upper and lower directions are determined, in the direction of the arrangement of the light reception elements and, on the basis of these threshold values, the determination of the presence or absence of a work A1 is performed. More specifically, the amount of displacement is calculated on the basis of the position of the received-light spot, and the absolute value of the difference between the calculated amount of displacement and the amount of displacement (the position) of the reference point obtained at the timing of the normal push of the set key 22 is determined to be a detected value, in the sensor mode. The detected value calculated as described above is used in determining the presence or absence of a work A1, which means that threshold values T21 and T22 which define a range symmetrical with respect to the reference point in the upper and lower directions are determined by defining only a single threshold value. The detected value can be displayed on the 7-segment LED display portion 26. More preferably, the detected value is displayed on the 7-segment LED display portion 26, along with the threshold values. Also, the amount of displacement of the reference point can be finely adjusted through the user's operations on the direction key 23 while it is displayed on the 7-segment LED display portion 26.

The measurement mode is constituted by a distance measurement mode and an area detection mode, for example, and switching therebetween can be performed by operating the direction key 23. The distance measurement mode is an operation mode in which the determination of the presence or absence of a work A1 is performed on the basis of a threshold value T3 defined between two reference points specified by the user, and measurement values are outputted. The area detection mode is an operation mode in which two reference points are defined as two threshold values, determination as to whether a work A1 exists in the area defined by the two threshold values is performed and measurement values are outputted.

In the distance measurement mode, the position of a received-light spot obtained at the timing of normal push of the set key 22 is set as a reference point, and the amount of displacement is calculated on the basis of the first reference point obtained by the first operation on the set key 22. The threshold value T3 for use in determining the presence or absence of a work A1 is automatically determined on the basis of the first reference point and a second reference point obtained by a second operation on the set key 22 performed at a timing different from the first operation.

Usually, the first operation on the set key 22 is performed at a state where no work A1 exists on the work bench A2 and the second operation on the set key 22 is performed at a state where a work A1 exists on the work bench A2. In this case, the threshold value T3 is defined at an intermediate point between the first reference point and the second reference point in the direction of the arrangement of the light reception elements and, on the basis of this threshold value, the determination of the presence or absence of a work A1 is performed. Measurement values are outputted only when a work A1 exists, but no measurement value is output when no work A1 exists.

In the area detection mode, the position of a received-light spot obtained at the timing of normal push of the set key 22 is set as a reference point. An area is defined in the heightwise direction, on the basis of a first reference point obtained by a first operation on the set key 22 and a second reference point obtained by a second operation on the set key 22 performed at timing different from the first operation. It is determined whether or not a work A1 exists in this area.

Usually, the first operation on the set key 22 is performed at a state where a first work exists on the work bench A2 and the second operation on the set key 22 is performed at a state where a second work having a height different from that of the first work exists on the work bench A2. Measurement values are outputted only when a work A1 exists in the area, but no measurement value is output when no work A1 exists therein.

Figure 5:
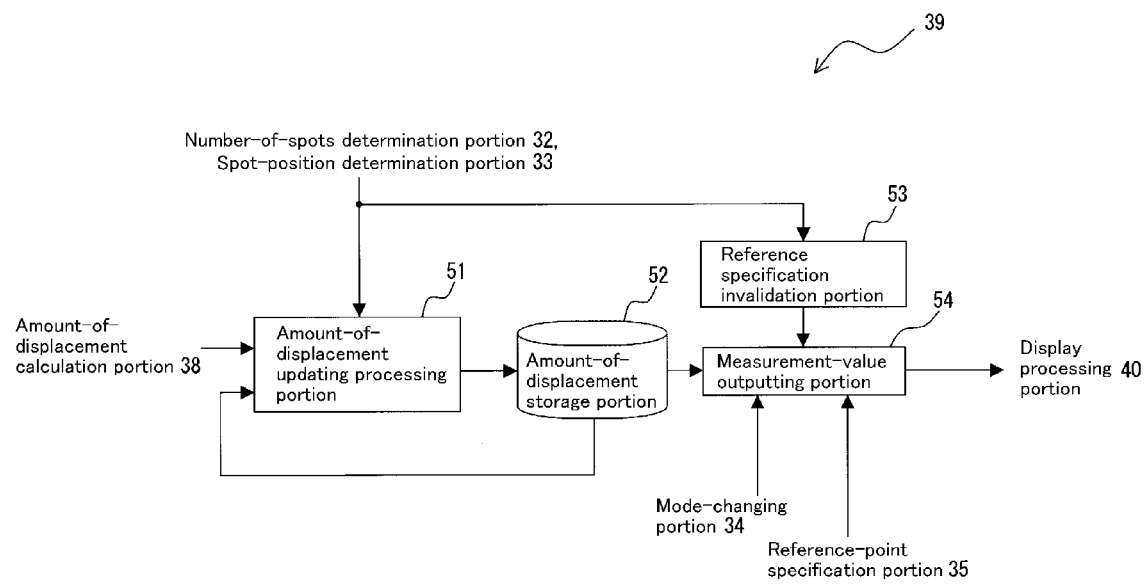
FIG. 5 is a block diagram illustrating an exemplary structure of a measurement processing portion 39 in the main-body unit 4 of FIG. 4.

FIG. 5 is a block diagram illustrating an exemplary structure of the measurement processing portion 39 in the main-body unit 4 of FIG. 4. The measurement processing portion 39 is constituted by an amount-of-displacement updating processing portion 51, an amount-of-displacement storage portion 52, a reference specification invalidation portion 53 and a measurement-value outputting portion 54. The amount-of-displacement storage portion 52 is a memory for storing the amount of displacement calculated by the amount-of-displacement calculation portion 38 such that it is rewritable.

The amount-of-displacement updating processing portion 51 performs updating processing for rewriting the amount of displacement stored in the amount-of-displacement storage portion 52, if a result of detection of a received-light spot is newly obtained. This updating processing is performed by selecting one of the result of the calculation by the amount-of-displacement calculation portion 38 and the amount of displacement stored in the amount-of-displacement storage portion 52, on the basis of the results of the determinations by the number-of-spots determination portion 32 and the spot-position determination portion 33.

More specifically, if the result of the calculation of an amount of displacement could not be newly obtained from the result of the current detection of a received-light spot, due to the occurrence of multiple reflections, the previous amount of displacement is maintained. On the other hand, if the result of the calculation of an amount of displacement could be newly obtained, the previous amount of displacement is replaced with the amount of displacement obtained this time.

The measurement-value outputting portion 54 performs operations for outputting, to the display processing portion 40, a measurement value obtained from the amount of displacement held in the amount-of-displacement storage portion 52, as a measurement-value output. The measurement-value outputting portion 54 calculates, for example, the distance from a reference point to the irradiation point of the projected light L1, from the amount of displacement of the work A1 and outputs the calculated distance.

The reference specification invalidation portion 53 performs processing for invalidating the specification of the reference point for the measurement-value outputting portion 54, on the basis of the results of the determinations by the number-of-spots determination portion 32 and the spot-position determination portion 33. More specifically, when a reference point is specified by operating the set key 22, if there are two or more received-light spots, the processing for invalidating the specification of the reference point is performed, but in other cases the invalidation processing is not performed.

In this case, the specification of the reference point is invalidated when the number of received-light spots is 0, 2 or more, and when the number of received-light spots is one but the width of the received-light spot does not fall within the predetermined range, but in other cases invalidation is not performed. That is, only when multiple reflections occur, the specification of the reference point is invalidated to cancel the operations and inputs performed by operating the set key 22.

Figure 6:
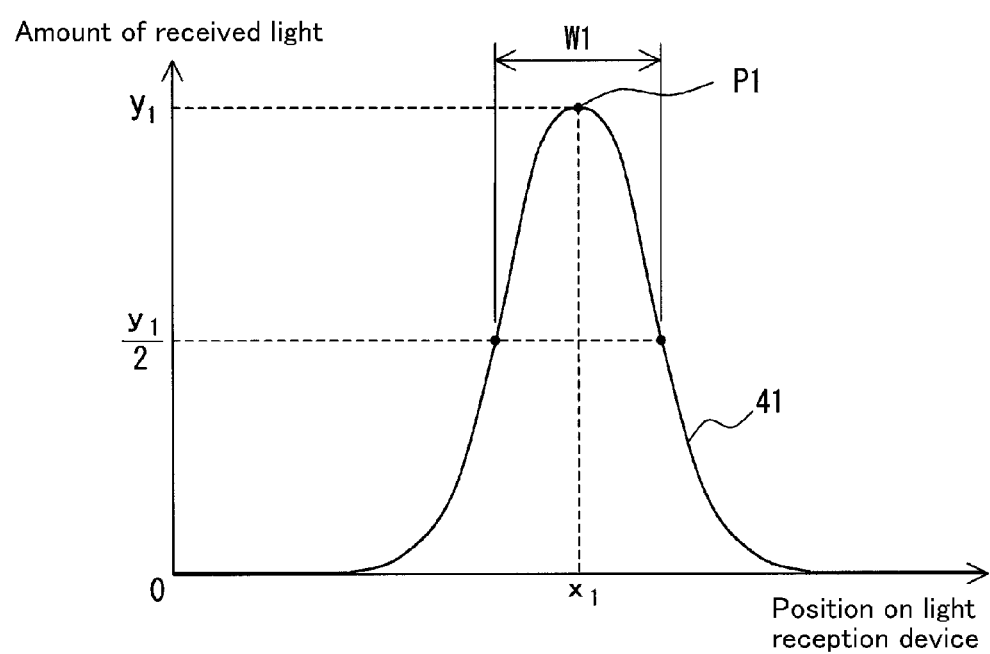
FIG. 6 is a view illustrating amounts of light received by the respective light reception elements in the optical displacement measurement device 1 of FIG. 1, designating the position on a light reception unit 14 along the horizontal axis while designating the amount of light received along the horizontal axis.

FIG. 6 is a view illustrating amounts of light received by the respective light reception elements in the optical displacement measurement device 1 of FIG. 1, by designating the position on the light reception unit 14 along the horizontal axis while designating the amounts of received light along the vertical axis. The curve 41 is a curve indicating a distribution of the amount of received light obtained from the output of the light reception unit 14 when the projected light L1 is directed, indicating a mound-shaped distribution having a maximum amount of received light at a position x1. That is, the curve 41 is monotonically ascended from a position having a smaller value on the light reception unit 14 up to the position x1 and then is monotonically descended after the position x1.

The spread of the mound-shaped distribution indicates the width of the received-light spot and the position x1 of the maximum point P1 (the peak position) indicates the position of the received-light spot. In this case, it is assumed that the width W1 of the received-light spot is determined, on the basis of the positions on the light reception unit 14 at which the amount of received light is one half the amount y1 of received light at the peak position x1. On the basis of the distribution of the amount of received light as described above, the determination of the presence or absence of a work A1 is performed.

Figure 7:
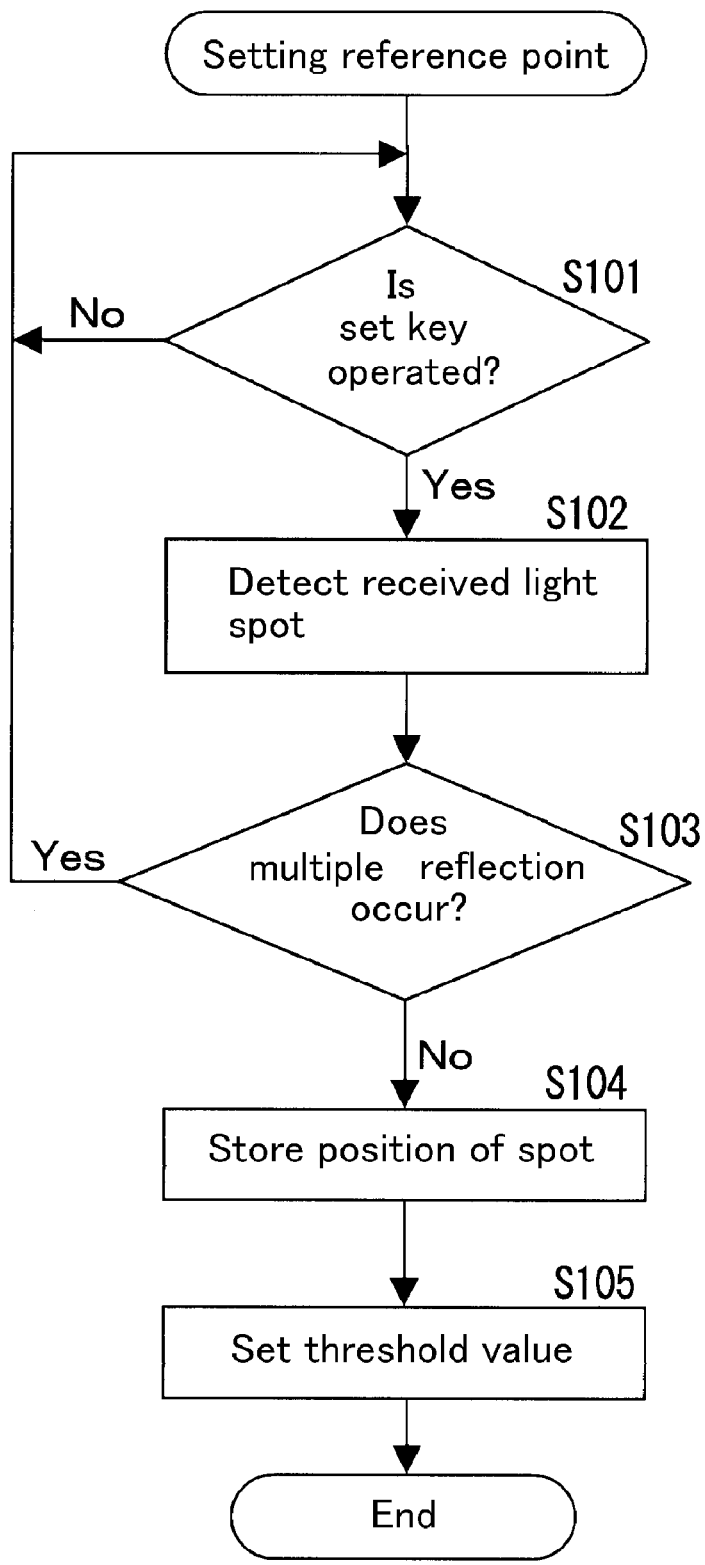
FIG. 7 is a flow chart illustrating exemplary operations of the optical displacement measurement device 1 of FIG. 1 for setting a reference point, illustrating a processing procedure for specifying a reference point in the sensor mode.

FIG. 7 is a flow chart illustrating exemplary operations of the optical displacement measurement device 1 of FIG. 1 for setting a reference point at steps S101 to S105, illustrating a processing procedure for specifying a reference point in the sensor mode. At first, if a long push of the set key 22 is performed, the reference-point specification portion 35 commands the object detection processing portion 36 to determine a reference point, on the basis of the inputted operation. The object detection processing portion 36 determines, as a reference point, the position of a received-light spot detected at the timing when the set key 22 was operated (steps S101 and S102).

At this time, if multiple reflections occur, the object detection processing portion 36 cancels the specification of the reference point and stands by until the set key 22 is operated, again (step S103). If no multiple reflections occur, the position of the determined reference point is stored and, on the basis of this reference point, threshold values T21 and T22 for use in detecting the presence or absence of a work A1 are defined (steps S104 and S105).

Figure 8:
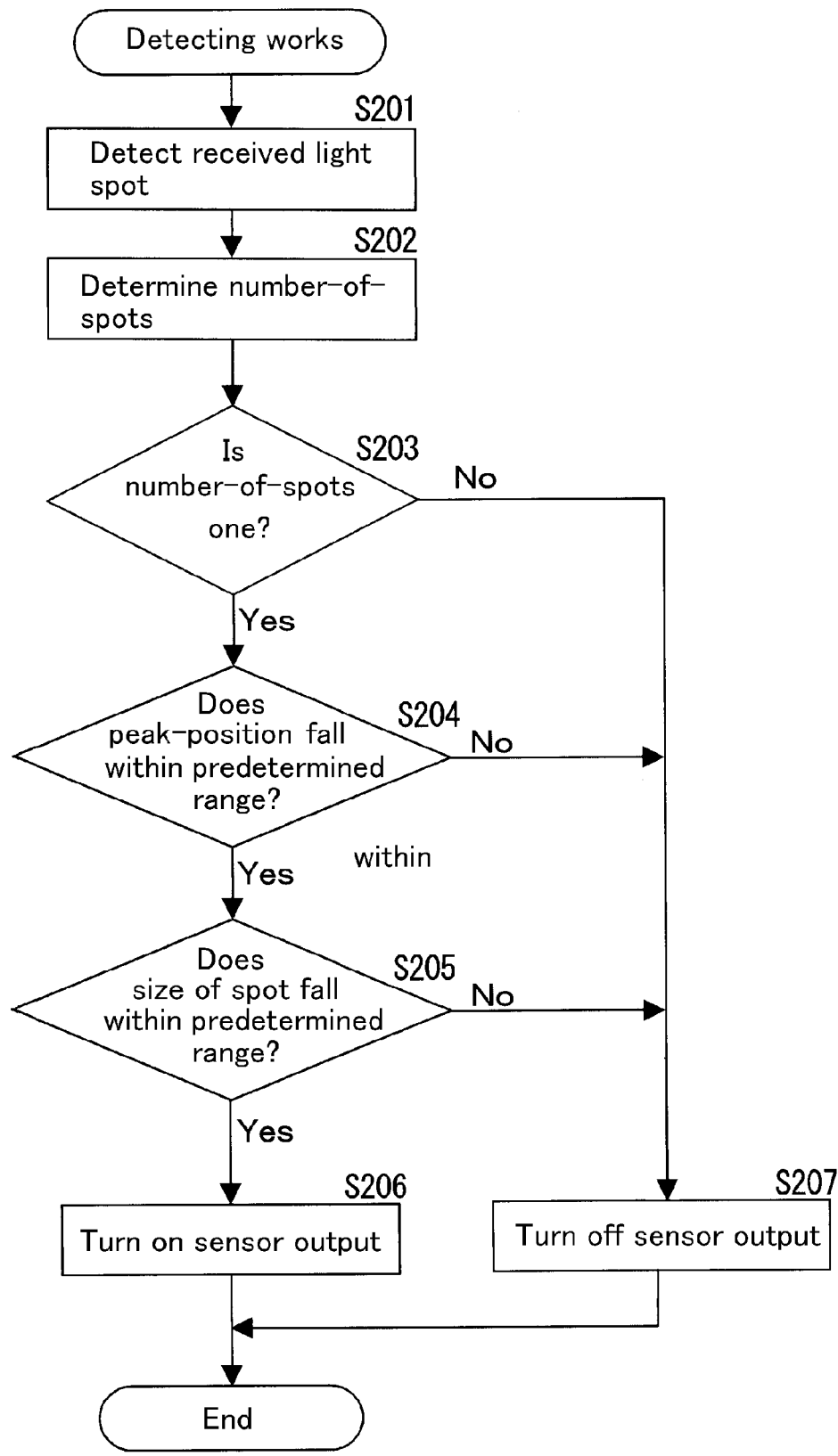
FIG. 8 is a flow chart illustrating exemplary operations of the optical displacement measurement device 1 of FIG. 1 for detecting works, illustrating a processing procedure for detecting works in the sensor mode.

FIG. 8 is a flow chart illustrating exemplary operations of the optical displacement measurement device 1 of FIG. 1 for detecting works at steps S201 to S207, illustrating a processing procedure for detecting the presence or absence of a work A1 in the sensor mode. At first, if the received-light-spot detection portion 31 detects received-light spots, the number-of-spots determination portion 32 determines the number of received-light spots on the basis of the result of the detection (steps S201 and S202). At this time, if the number of received-light spots is not one, the object detection processing portion 36 determines that a work A1 exists, then turns on the sensor output and switches the voltage level of detection signals from a low level to a high level (steps S203 and S207).

On the other hand, if the number of received-light spots is one, the spot-position determination portion 33 performs processing for determining the position of the received-light spot. At this time, if the position of the received-light spot does not fall within a predetermined range, even though the number of received-light spots is one, the object detection processing portion 36 determines that a work A1 exists, then turns on the sensor output and switches the voltage level of detection signals from the low level to the high level (steps S204 and S207).

On the other hand, if the number of received-light spots is one and, also, the position of the received-light spot falls within the predetermined range, then the spot-position determination portion 33 performs processing for determining the size of the received-light spot, namely the width of the received-light spot. At this time, if the size of the received-light spot does not fall within a predetermined range, even though the number of received-light spots is one and the position of the received-light spot falls within the predetermined range, the object detection processing portion 36 determines that a work A1 exists, then turns on the sensor output and switches the voltage level of detection signals from the low level to the high level (steps S205 and S207).

On the other hand, if the number of received-light spots is one, the position of the received-light spot falls within the predetermined range and the size of the received-light spot falls within the predetermined range, the object detection processing portion 36 determines that no work, A1 exists, then turns off the sensor output and switches the voltage level of detection signals from the high level to the low level (steps S205 and S206).

FIGS. 9A to 9E are views illustrating exemplary operations of the optical displacement measurement device 1 of FIG. 1, illustrating a distribution of the amount of received light obtained when the projected light is directed to a work A1 made of a packaged member having shiny surface. In this case, the determination of the presence or absence of the work A1 made of a packaged member having a shiny surface such as a member packaged by an aluminum foil is performed.

Figure 9A:
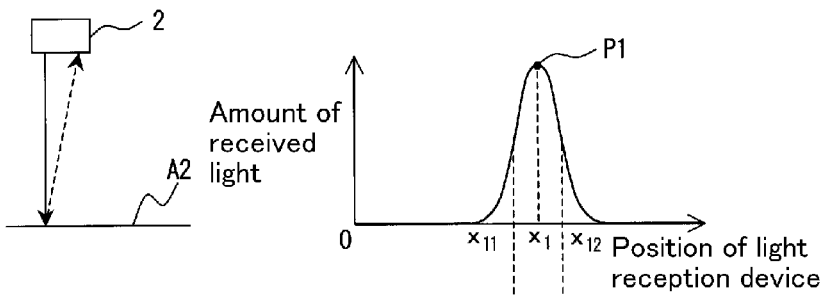
FIGS. 9A-E are views illustrating exemplary operations of the optical displacement measurement device 1 of FIG. 1, illustrating a distribution of the amount of received light obtained when the projected light is directed to a work A1 that a packaged member having a shiny surface.

FIG. 9A illustrates a distribution of the amount of received light obtained when no work A1 existed on the work bench A2. This distribution of the amount of received light is a mound-shaped distribution having a maximum amount of received light at a position x1 (a maximum point P1). Usually, a reference point is specified at this state, and threshold values x11 and x12 for use in presence/absence determination are defined. That is, the determination of the presence or absence of a work A1 is performed, on the basis of whether or not the peak position of the received-light spot falls within the range from the threshold value x11 to the threshold value x12.

Figure 9B:
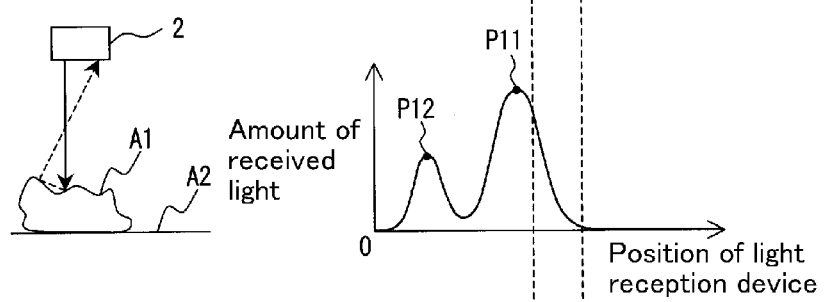

FIG. 9B illustrates a distribution of the amount of received light obtained when the projected light directed to the work A1 is irregularly reflected by the work surface and light reflected at a point on the work A1 which is largely deviated from the irradiation point is received. In the distribution of the amount of received light, the amount of received light is peaked at maximum points P11 and P12, thereby causing two received-light spots to be detected. At the maximum point P12, the amount of received light is smaller than that at the maximum point P11, and the received-light spot including the maximum point P12 as a peak forms a virtual image induced by multiple reflections and is regarded as reflected light reflected at a position higher than the irradiation point of the projected light. The positions of the received-light spots are shifted to the position which is left of that in FIG. 9A, according to the height of the irradiation point or the reflection point with respect to the work bench A2. In such a case, there are a plurality of received-light spots, which results in the determination that the work A1 exists, thereby causing the sensor output to be turned on.

Figure 9C:
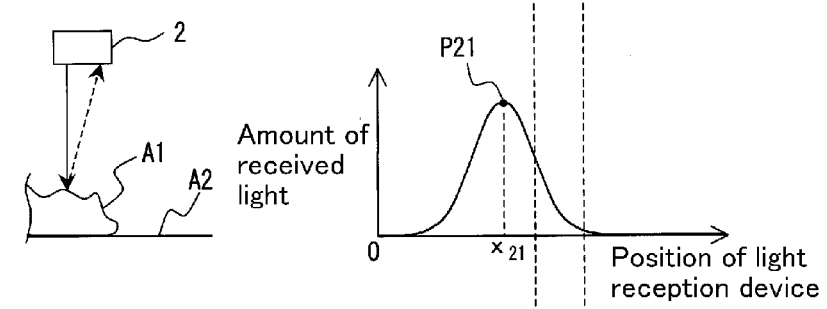

FIG. 9C illustrates a distribution of the amount of received light obtained when the projected light directed to the work A1 is reflected by the work surface and the reflected light is received. In the distribution of the amount of received light, the amount of received light is peaked only at a maximum point P21, thereby causing a single received-light spot to be detected. The maximum point P21 is shifted at the position which is left of that in FIG. 9A, according to the height of the irradiation point. In such a case, even though there is a single received-light spot, the position x21 of the received-light spot does not fall within the range from x11 to x12, which results in the determination that the work A1 exists, thereby causing the sensor output to be turned on.

Figure 9D:
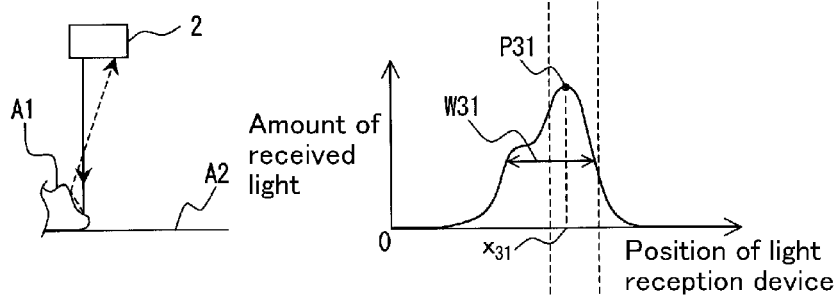

FIG. 9D illustrates a distribution of the amount of received light obtained when the projected light directed to the work A1 is irregularly reflected by the work surface and light reflected at a point on the work A1 which is slightly deviated from the irradiation point is received. In the distribution of the amount of received light, the amount of received light is peaked only at a maximum point P31, thereby causing a single received-light spot to be detected. The received-light spot including the maximum point P31 as a peak has a width W31 greater than that of FIG. 9A, due to the influence of multiple reflections. In such a case, even though there is a single received-light spot and the position x31 of the received-light spot falls within the range from x11 to x12, the width W31 of the received-light spot does not fall within the predetermined range, which results in the determination that the work A1 exists, thereby causing the sensor output to be turned on.

Figure 9E:
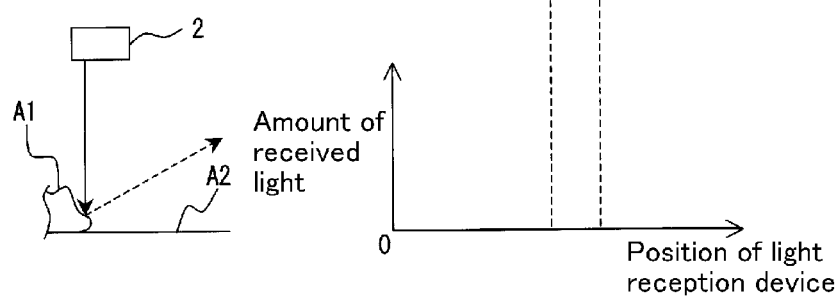

FIG. 9E illustrates a distribution of the amount of received light obtained when the projected light directed to the work A1 is reflected by the work surface in a direction different from the direction toward the light reception unit and the reflected light is not received thereby. In this case, no received-light spot is detected, which results in the determination that the work A1 exists, thereby causing the sensor output to be turned on. As described above, in the case where the work A1 made of a packaged member having a shiny surface is detected, it is possible to detect, correctly, the presence or absence of the work A1, regardless of the position of the irradiation point on the work A1.

Figure 10A:
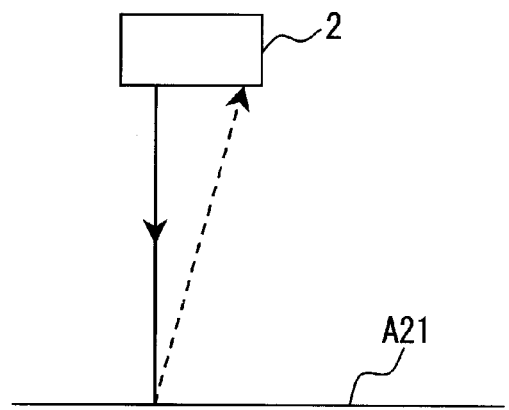
FIGS. 10A-C are views illustrating exemplary operations of the optical displacement device 1 of FIG. 1, illustrating operations for detecting a work A11 made of a packaged member having high transparency.
Figure 10B:
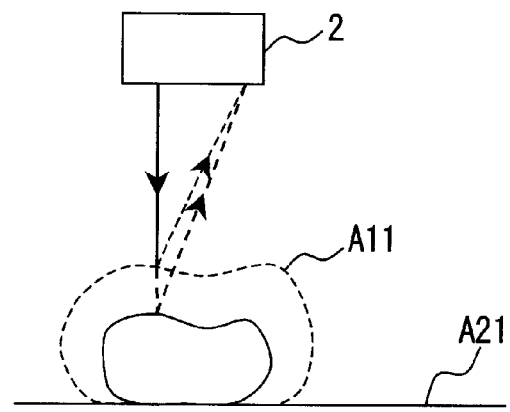
Figure 10C:
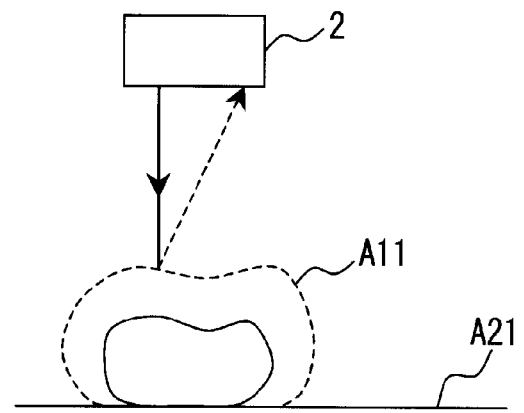

FIGS. 10A to 10C are views illustrating exemplary operations of the optical displacement device 1 of FIG. 1, illustrating operations for detecting a work A11 made of a packaged member having high transparency. In this case, the work A11 made of a member enwrapped in a transparent packaging member such as a vinyl sheet is an object to be subjected to presence/absence detection.

FIG. 10A illustrates a case where no work A11 exists on the work bench A21. In this case, a received-light spot with a proper width is detected at a proper position, and it is determined that no work A1 exists, thereby causing the sensor output to be turned off.

FIG. 10B illustrates a case where the projected light directed to the work A11 is passed through the packaging member and the light reflected by the work surface and the inside thereof is received. In this case, a plurality of received-light spots are detected. In this case, since there are a plurality of received-light spots, it is determined that the work A11 exists, thereby causing the sensor output to be turned on.

FIG. 10C illustrates a case where the projected light directed to the work A11 is reflected by the work surface and the reflected light is received. In this case, a single received-light spot is detected. In such a case, even though there is a single received-light spot, the position of the received-light spot does not fall within a predetermined range and, therefore, it is determined that the work A11 exists, thereby causing the sensor output to be turned on. As described above, even when a work A11 made of a packaged member having high transparency is detected, it is possible to determine correctly the presence or absence of the work A11 anytime.

Figure 11A:
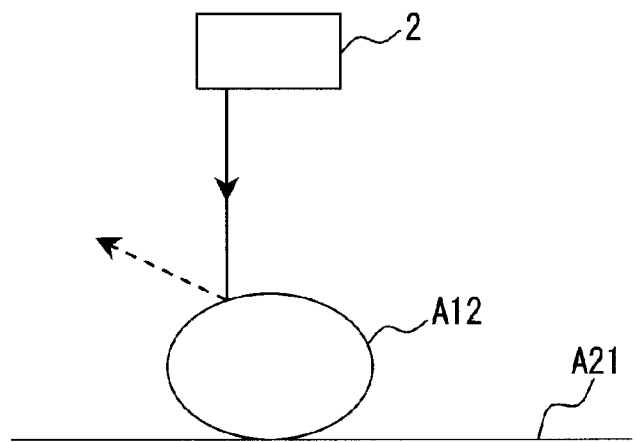
FIGS. 11A-B are views illustrating other exemplary operations of the optical displacement measurement device 1 of FIG. 1.
Figure 11B:
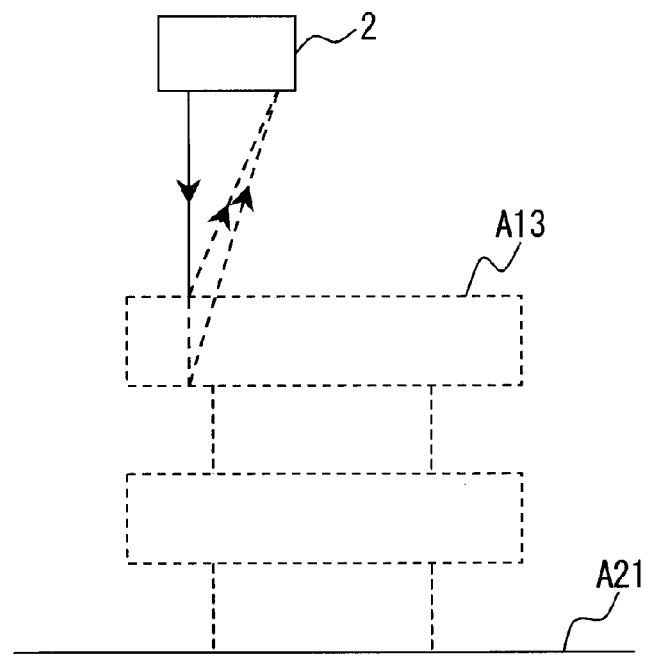

FIGS. 11A and 11B are views illustrating other exemplary operations of the optical displacement measurement device 1 of FIG. 1. FIG. 11A illustrates a case where a work A12 made of a member having a mirror surface is detected, and FIG. 11B illustrates a case where a work A13 made of a semi-transparent member having a complicated shape is detected.

The projected light directed to the work A12 may be reflected by the work surface in a direction different from the direction toward the light reception unit and, therefore, the reflected light may not be received thereby, depending on the position of the irradiation point. Even in such a case, it is determined that a work A12 exists, thereby causing the sensor output to be turned on correctly, since no received-light spot is detected. Further, it is assumed that the work bench A21 for use in detecting the work A12 has lower reflectivity than that of the work A12, and the light reflected thereby is correctly received when the work A12 does not exist thereon.

There is illustrated a case where the projected light directed to the work A13 is passed through the semi-transparent member, and the light reflected by the work surface and the inside thereof is received. In this case, a plurality of received-light spots are detected. Even in such a case, it is determined that the work A13 exists, thereby causing the sensor output to be turned on correctly, since there are plural received-light spots. As described above, even when a work A12 made of a member having a mirror surface or a work A13 made of a semi-transparent member having a complicated shape is detected, it is possible to determine correctly the presence or absence of the work anytime.

Figure 12A:
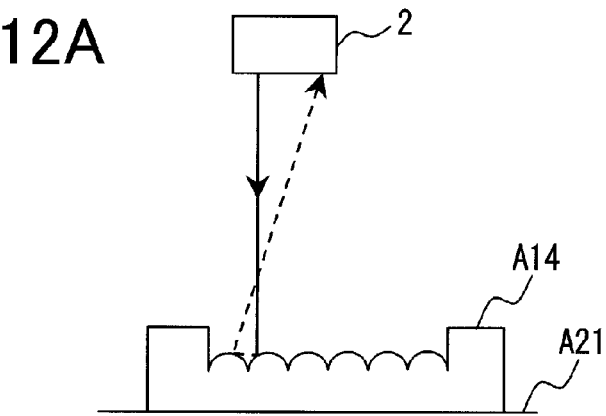
FIGS. 12A-C are views illustrating other exemplary operations of the optical displacement measurement device 1 of FIG. 1, illustrating cases where a metal processed article is an object to be detected, and the front and back sides thereof are detected.
Figure 12B:
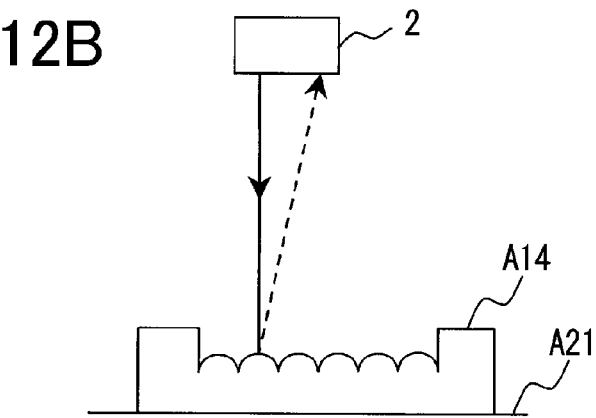
Figure 12C:
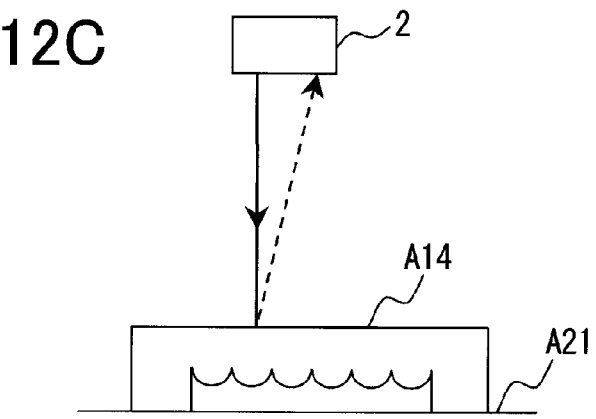

FIG. 12A to 12C are views illustrating other exemplary operations of the optical displacement measurement device 1 of FIG. 1, illustrating cases where a metal processed article is an object to be detected, and the front and back sides thereof are detected. In this case, a work A14 made of a metal processed article such as a bearing is to be detected at its front and back sides. Further, the back surface of the work A1 is defined as a reference point, while the front surface thereof has a complicated shape or a shiny surface.

FIG. 12A illustrates a case where the projected light directed to the work A14 is irregularly reflected by the work surface, and light reflected at a point on the work A14 which is deviated from the irradiation point is received. In this case, there are a plurality of received-light spots and, therefore, it is determined that the work A14 is placed with its front surface exposed, thereby causing the sensor output to be turned off.

FIG. 12B illustrates a case where the projected light directed to the work A14 is reflected at a position different from that in 12B, and the reflected light is received in this case, there is a single received-light spot, but the position of the received-light spot does not fall within the predetermined range, and, therefore, it is determined that the work A14 is placed with its front surface exposed, thereby causing the sensor output to be turned off.

FIG. 12C illustrates a case where the projected light directed to the work A14 is reflected by the work surface, and the reflected light is received. In this case, a received-light with a proper width is detected at a proper position, and it is determined that the work A14 is placed with its back surface exposed, thereby causing the sensor output to be turned on. As described above, even when the work A14 made of a metal processed article is detected at its front and back sides, it is possible to determine correctly the front and back sides thereof anytime.

Figure 13A:
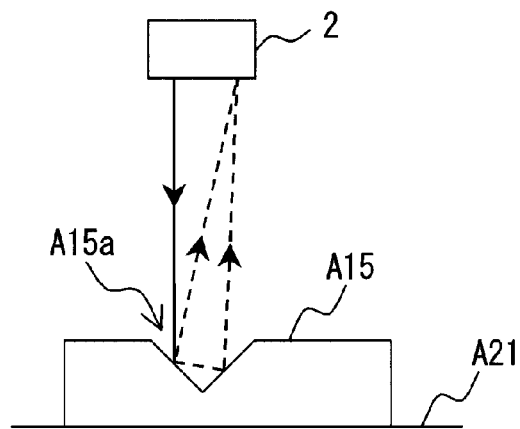
FIGS. 13A-C are views illustrating other exemplary operations of the optical displacement measurement device 1 of FIG. 1, illustrating a case where a metal processed article is a target object, and determination of the presence or absence thereof is performed.
Figure 13B:
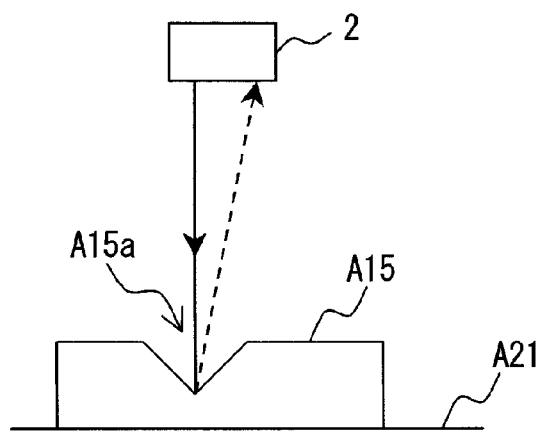
Figure 13C:
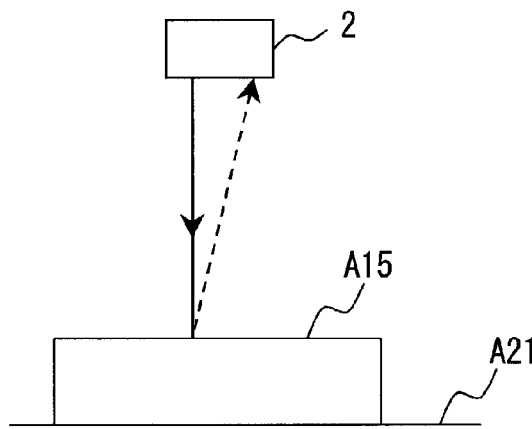

FIGS. 13A to 13C are views illustrating other exemplary operations of the optical displacement measurement device 1 of FIG. 1, illustrating a case where a metal processed article is a target object, and determination of the presence or absence thereof is performed. In this case, a processed portion A15a such as a cutout groove formed in the work A15 is to be detected. Further, the surface of the work A15 other than the processed portion A15a is defined as a reference point.

FIG. 13A illustrates a case where the projected light directed to the processed portion A15a in the work A15 is irregularly reflected by the inside of the processed portion, and light reflected by a point in the processed portion which is deviated from the irradiation point is received. In this case, there are a plurality of received-light spots and, therefore, it is determined that the processed portion A15a exists in the work A15, thereby causing the sensor output to be turned off.

FIG. 13B illustrates a case where the projected light directed to the work A15 is reflected by the inside of the processed portion, and the reflected light is received. In this case, there is a single received-light spot, but the position of the received-light spot does not fall within the predetermined range and, therefore, it is determined that the processed portion A15a exists in the work A15, thereby causing the sensor output to be turned off.

FIG. 13C illustrates a case where the projected light directed to the work A15 is reflected by the work surface, and the reflected light is received. In this case, a received-light with a proper width is detected at a proper position, and it is determined that no processed portion A15a exists in the work A15, thereby causing the sensor output to be turned on. As described above, even when a metal processed article is a target object and the determination of the presence or absence thereof is performed, it is possible to determine correctly the presence or absence thereof.

Figure 14A:
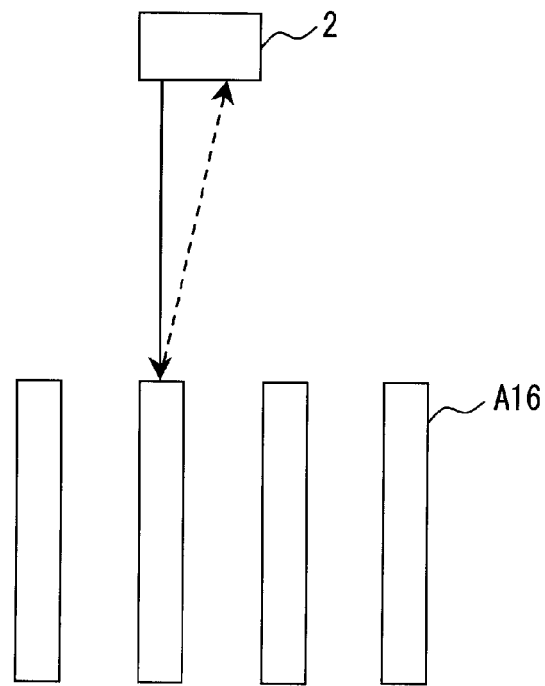
FIGS. 14A-B are views illustrating other exemplary operations of the optical displacement measurement device 1 of FIG. 1, illustrating a case where the result of detection of a work A16 is utilized for positioning the work A16.
Figure 14B:
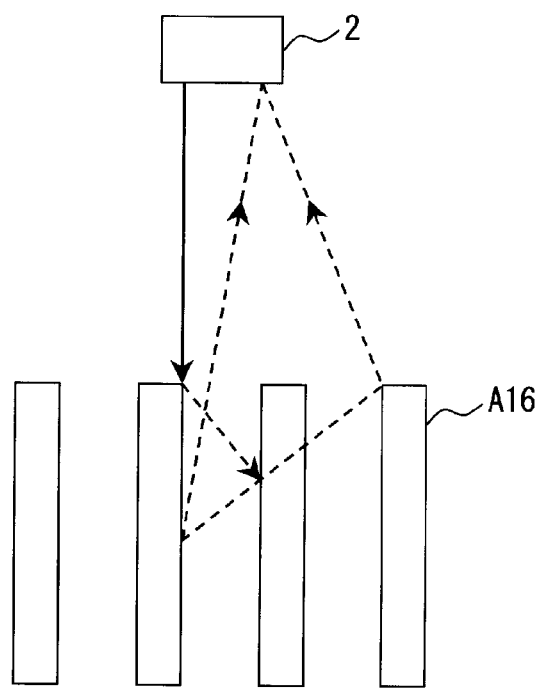

FIGS. 14A and 14B are views illustrating other exemplary operations of the optical displacement measurement device 1 of FIG. 1, illustrating a case where a work A16 made of plural glass substrates is to be detected at the substrate end surfaces, and the result of the detection of the work A16 is utilized for positioning the work A16. In this case, the work A16 made of the plural glass substrates on which semiconductor devices such as transistors are formed is to be detected at the substrate end surfaces. Further, the substrate end surfaces in the work A16 are defined as a reference point.

FIG. 14A illustrates a case where the projected light directed to the work A16 is reflected by the end surface of a glass substrate, and the reflected light is received. In this case, a received-light spot with a proper width is detected at a proper position, and it is determined that the work A16 exists at a proper position, thereby causing the sensor output to be turned on.

FIG. 14B illustrates a case where the projected light directed to the work A16 is irregularly reflected at portions between glass substrates or inside substrates, and light reflected at points deviated from the irradiation point is received. In this case, there are a plurality of received-light spots and, therefore, it is determined that the position of the work A16 is not proper, thereby causing the sensor output to be turned off.

Figure 15:
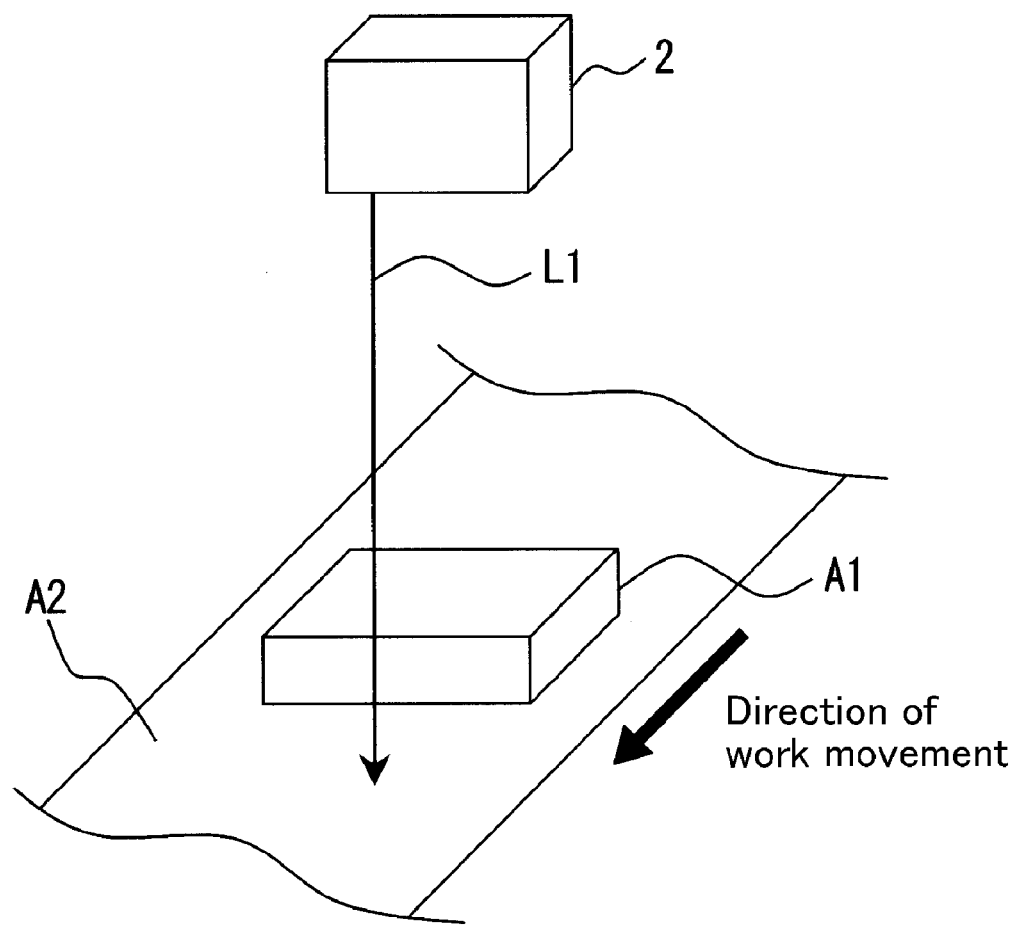
FIG. 15 is a perspective view illustrating an exemplary operation of the optical displacement measurement device 1 of FIG. 1, illustrating a state where the height of a work A1 changing its position is determined in a measurement mode.

FIG. 15 is a perspective view illustrating an exemplary operation of the optical displacement measurement device 1 of FIG. 1, illustrating a state where the height of a work A1 moving in the direction of the line is continuously determined. In the case where the height of the work A1 slowly moving along a work bench A2 such as a belt conveyer is repeatedly detected at time intervals smaller than the speed of the movement of the work A1, the end portions of the work A1 are repeatedly detected. While the projected light L1 is scanned over the end portions of the work A1, the distribution of the amount of received light is distorted by being influenced by multiple reflections at the work end portions and, also, the distribution of the amount of received light is largely changed at every detection, thereby reducing the accuracy of the determination of the height.

Figure 16A:
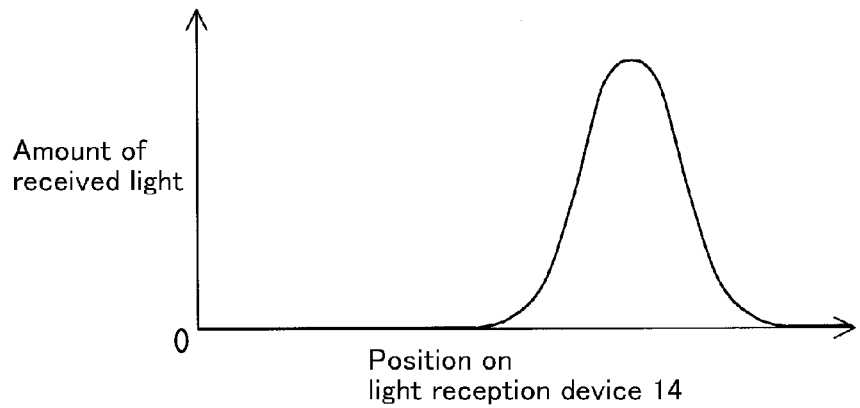
FIGS. 16A-C are transition diagrams illustrating exemplary operations of the optical displacement measurement device 1 of FIG. 1, illustrating distributions of the amount of received light obtained when the projected light L1 is directed to a work A1 moving in the direction of the line.
Figure 16B:
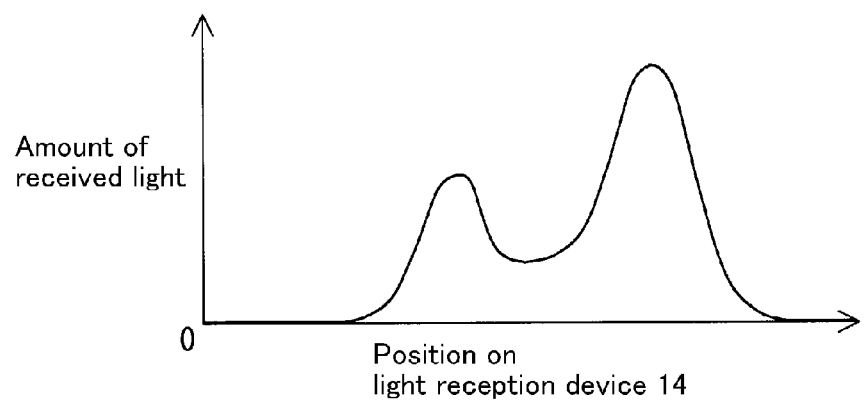
Figure 16C:
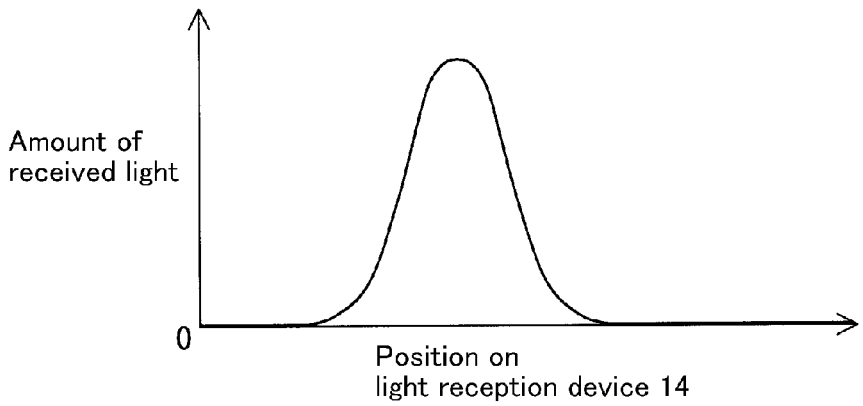

FIGS. 16A to 16C are transition diagrams illustrating exemplary operations of the optical displacement measurement device 1 of FIG. 1, illustrating distributions of the amount of received light obtained when the projected light L1 is directed to a work A1 moving in the direction of the line. FIG. 16A illustrates a distribution of the amount of received light which is caused by light reflected by portions before the work A1. FIG. 16B illustrates a distribution of the amount of received light which is caused by light reflected by an end portion of the work A1. FIG. 16C illustrates a distribution of the amount of received light which is caused by light reflected by portions of the work A1 other than the end portions thereof.

When the head unit 2 exists before work A1, light reflected by the work bench A2 is received, and a single received-light spot is detected. When an end portion of the work A1 is moved to beneath the head unit 2, the distribution of the amount of received light is distorted due to the influence of multiple reflections at the end portion of the work, and a plurality of received-light spots are detected. In the present embodiment, during the occurrence of such multiple reflections, the processing for calculating the amount of displacement is not performed, and the result of the previous calculation is maintained.

Figure 17:
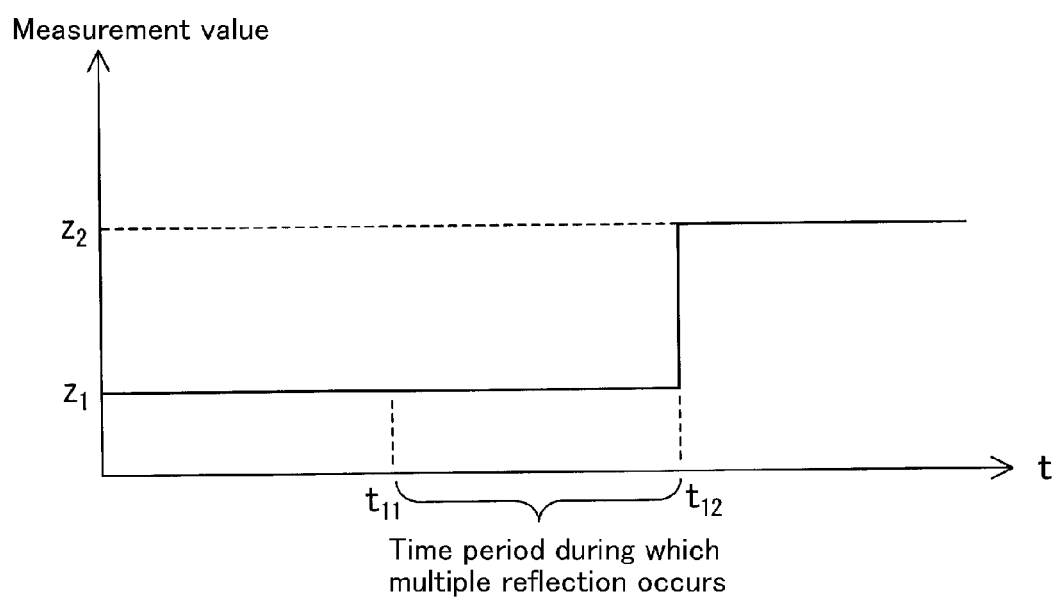
FIG. 17 is a timing chart illustrating an exemplary measurement operation of the optical displacement measurement device 1 of FIG. 1, illustrating measurement-value outputs obtained when a work A1 moving in the direction of the line is measured.
Figure 18:
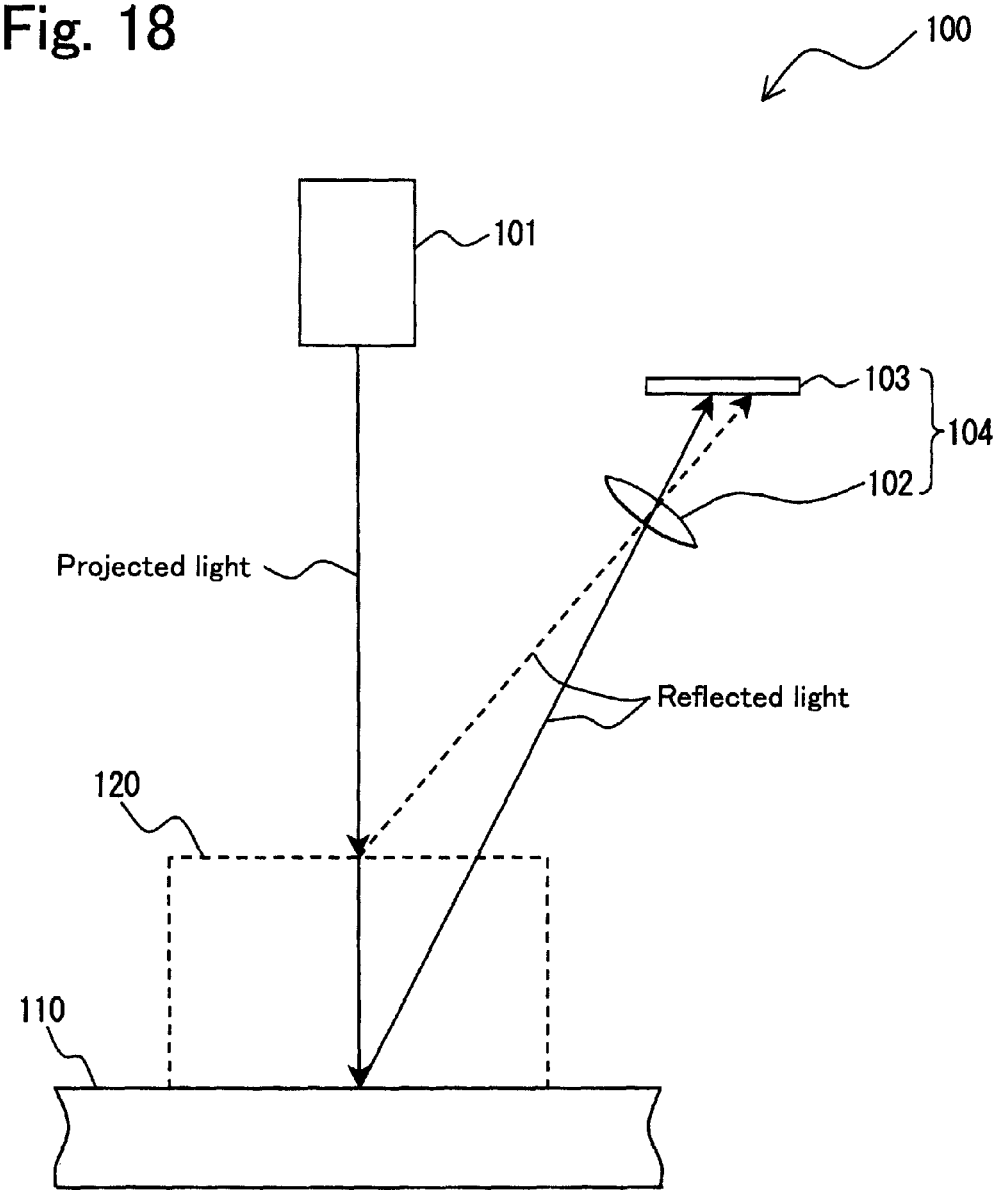
FIG. 18 is a view illustrating the structure of a conventional optical displacement sensor 100, illustrating schematically a state where projected light emitted from a light projection unit 101 is received.
Figure 19:
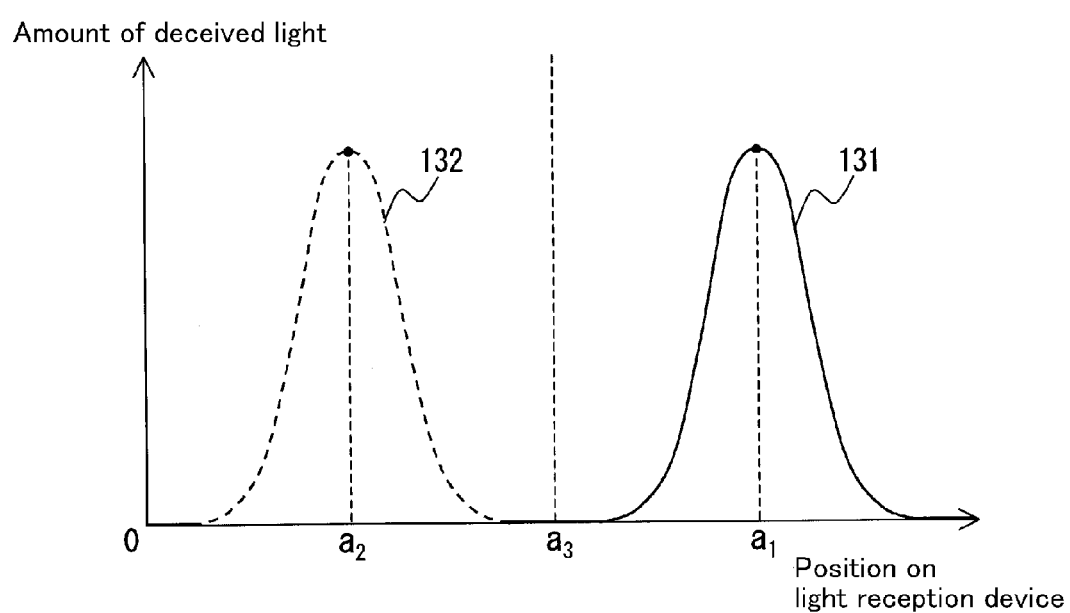
FIG. 19 is a view illustrating the amount of light received by the respective light reception elements in the optical displacement sensor 100, designating the position on a light reception unit 103 along the horizontal axis while designating the amounts of received light along the vertical axis.
Figure 20:
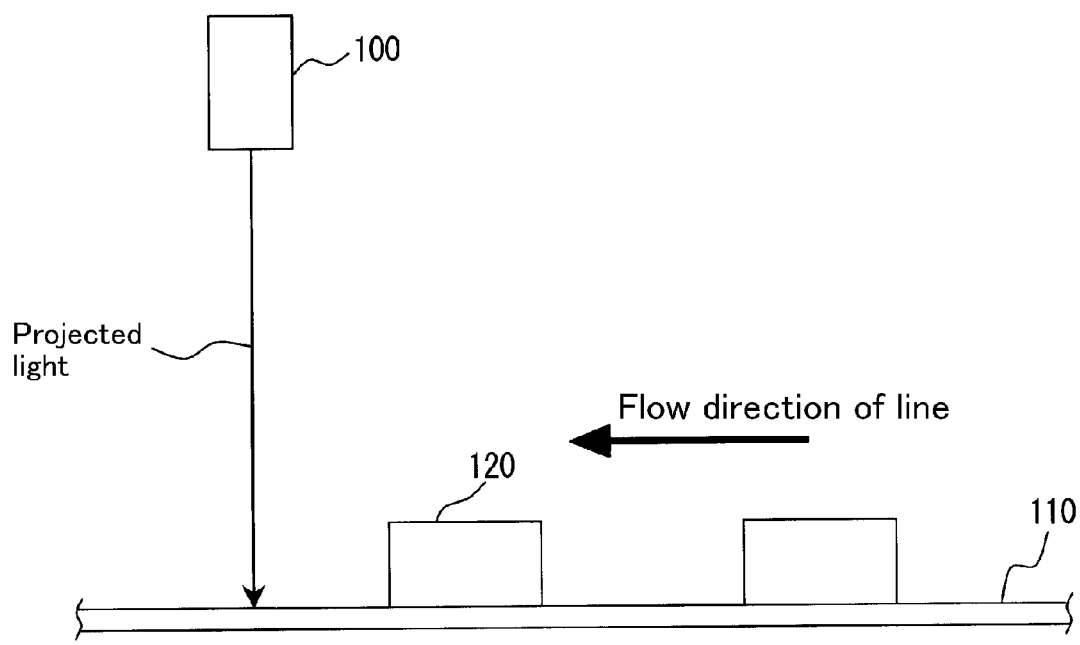
FIG. 20 is a view illustrating the optical displacement sensor 100 placed in a manufacturing line.
Figure 21:
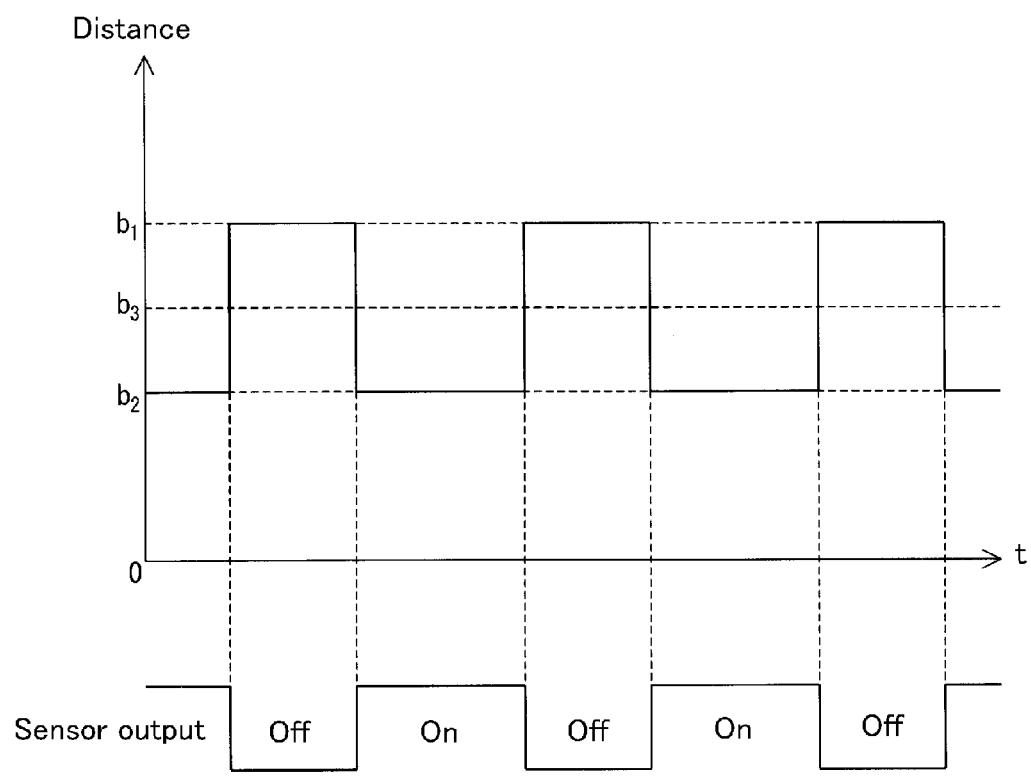
FIG. 21 is a timing chart illustrating operations of the optical displacement sensor 100 for detection of works, illustrating the distance to a work 120 and the sensor output.
Figure 22:
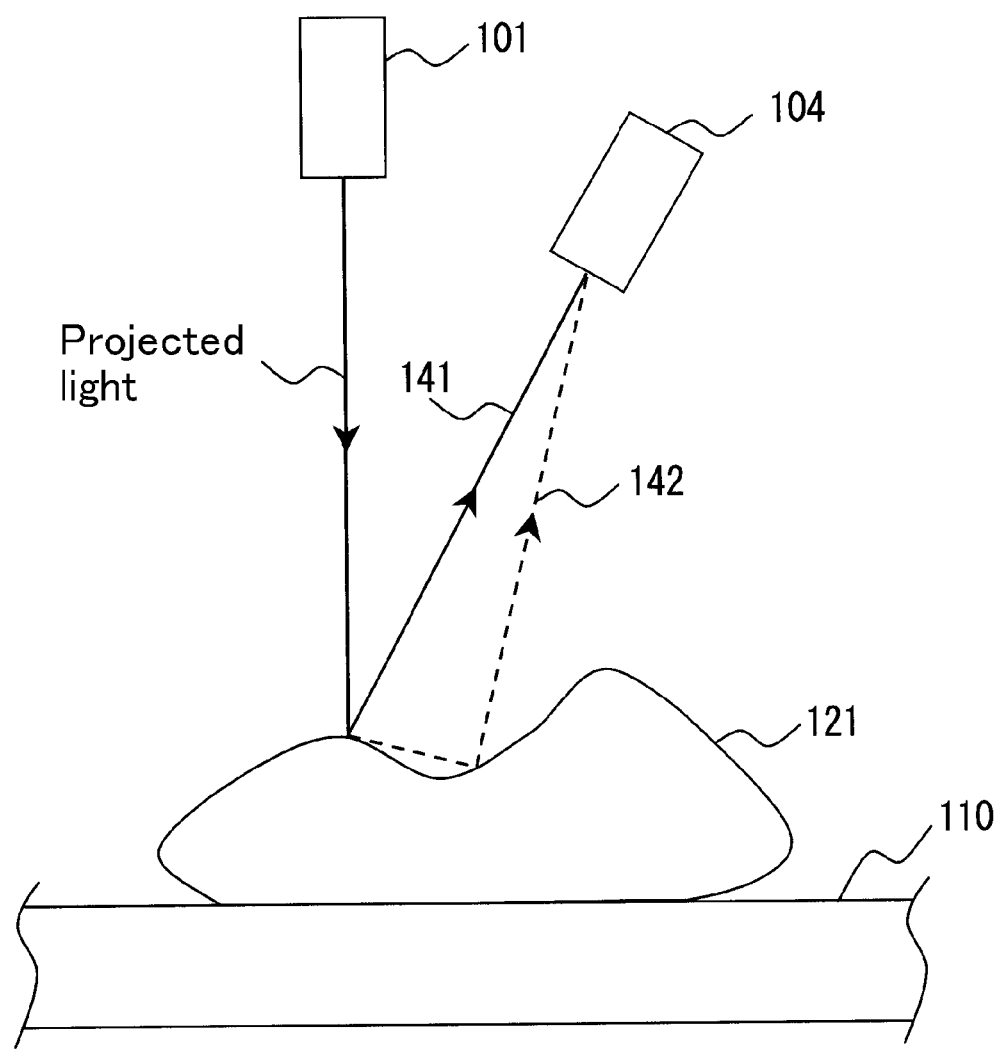
FIG. 22 is a view illustrating an optical displacement sensor 100 for detecting a work 121 having shiny surface placed on a work bench 110.
Figure 23:
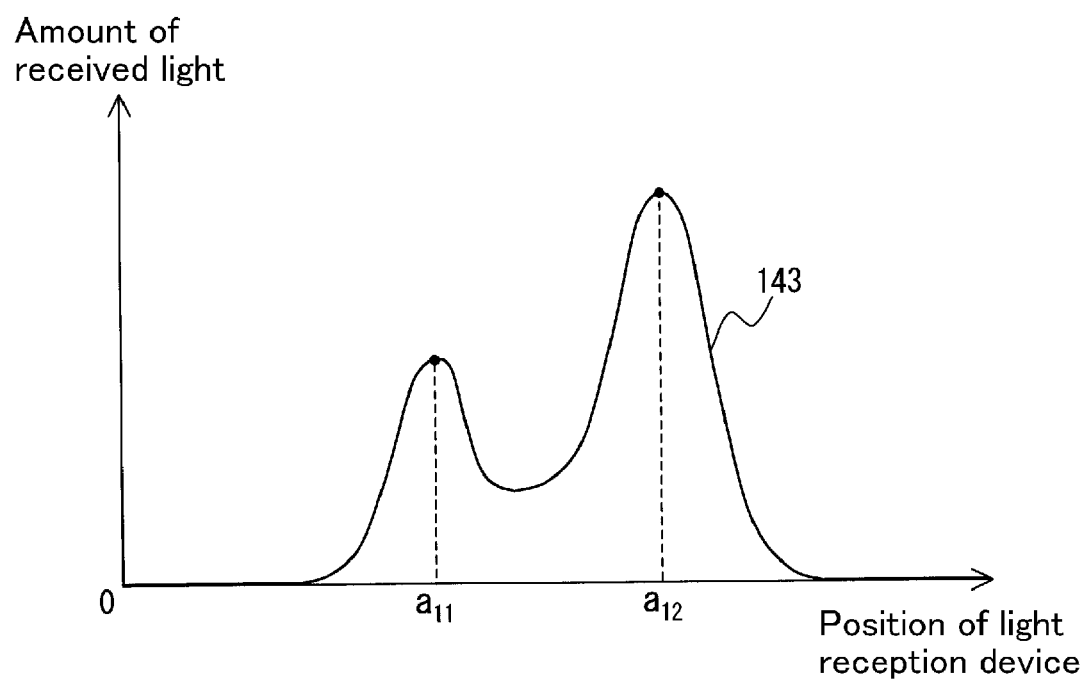
FIG. 23 is a view illustrating the amount of light received by the respective light reception elements in the optical displacement sensor 100, illustrating a curve 143 indicating a distribution of the amount of received light.

FIG. 17 is a timing chart illustrating an exemplary measurement operation of the optical displacement measurement device 1 of FIG. 1, illustrating measurement values resulted from continuous measurements of the height of a work A1 moving in the direction of the line. During the time period during which multiple reflections occur, a measurement value of d1 resulted from measurement when the head unit 2 exists before the work A1 is maintained and is output as a measurement value output. When the multiple-reflection state has been overcome due to the movement of the work A1, the measurement value of the amount of displacement is updated. In this example, it is updated to a measurement value of d2 at the time t12.

According to the present embodiment, each portion such as a received-light spot detection portion 31, a number-of-spots determination portion 32, a spot-position determination portion 33, a mode-changing portion 34, a reference-point specification portion 35, an object detection processing portion 36, an object surface-state display controlling portion 37, an amount-of-displacement calculation portion 38, a measurement processing portion 39 and a display processing portion 40 describes individually, however, the present invention is not limited in this embodiment. For example, the entire portions may be achieved by one control device such as CPU and ASIC, multiple control devices may achieve one portion, or the combination of them may achieve each portion.

According to the present embodiment, detection signals are outputted on the basis of the number of detected received-light spots, which enables correctly detecting the presence or absence of an object, even when the target object has a highly reflective or a shiny surface. Particularly, detection signals are outputted on the basis of the number of received-light spots and the one-dimensional positions of the received-light spots, which can further improve the detection accuracy in detecting the presence or absence of an object. Further, displaying of the presence or absence of multiple reflections caused by the target object is distinguishably performed, on the basis of the number of detected received-light spots, which enables the user to recognize whether or not the distribution of the amount of received light is distorted. Accordingly, in cases of constantly displaying the amount of displacement of the target object as a measurement value, it is possible to enable the user to recognize whether or not multiple reflections occur.

What is claimed is:

1. An optical displacement sensor comprising:
    a light projection unit for directing projected light to a target object;
    a light reception unit comprising two or more light reception elements arranged in a linear shape for receiving light reflected by said target object out of said projected light and outputting signals corresponding to the amount of received light;
    a received-light-spot detection unit for detecting a received-light spot on said light reception unit, on the basis of the outputs of said respective light reception elements;

a number-of-spots determination unit for determining the number of said received-light spots, on the basis of the received-light spot detected by said received-light-spot detection means;

a spot-position determination unit capable of determining a one-dimensional position of said received-light spot corresponding to an amount of displacement of said target object on the basis of the result of the detection by said received-light-spot detection unit; and an object detection unit for determining the presence or absence of said target object on the basis of (a) the number of said received-light spots determined by said number-of-spots determination unit and (b) the one-dimensional position of said received-light spot determined by said spot-position determination unit, and outputting detection signals indicative of the result of the determination of the presence or absence of said target object.

2. The optical displacement sensor according to claim 1, wherein said object detection unit determines the presence or absence of a target object, on the basis of the result of the determination by said spot-position determination unit, when the number of received-light spots is one.

3. The optical displacement sensor according to claim 2, wherein, when the number of received-light spots is one and the one-dimensional position of the received-light spot falls within a predetermined range, said object detection unit outputs detection signals different from those in other cases.

4. The optical displacement sensor according to claim 2, wherein said spot-position determination unit determines the width of the received-light spot and, when the number of received-light spots is one, the one-dimensional position of the received-light spot falls within a predetermined range and the width of the received-light spot falls within a predetermined range, said object detection unit outputs detection signals different from those in other cases.

5. The optical displacement sensor according to claim 2, further comprising an amount-of-displacement display unit for calculating the amount of displacement of said target object on the basis of the result of the determination by said spot-position determination unit and displaying the result of the calculation, and a multiple-reflection display unit for displaying the presence or absence of multiple reflections caused by said target object to distinguish the presence and the absence, on the basis of the result of the determination by said number-of-spots determination unit.

6. The optical displacement sensor according to claim 5, wherein said multiple-reflection display unit displays an indication representing that the number of received-light spots is one, which is different from an indication representing that two or more received-light spots exists.

7. The optical displacement sensor according to claim 5, wherein said spot-position determination unit determines the width of the received-light spot, on the basis of the outputs of the respective light reception elements, and, when the number of received-light spots is one and the width of the received-light spot falls within a predetermined range, said multiple-reflection display unit performs displaying different from that in other cases.

8. An optical displacement measurement device comprising:

a light projection unit for directing projected light to a target object;

a light reception unit comprising two or more light reception elements arranged in a linear shape for receiving light reflected by said target object out of said projected light and outputting signals corresponding to the amount of received light;

a received-light-spot detection means for detecting a received-light spot on said light reception unit, on the basis of the outputs of said respective light reception elements;

a number-of-spots determination means for determining the number of said received-light spots, on the basis of the received-light spot detected by said received-light-spot detection means;

a spot-position determination means for determining a one-dimensional position of said received-light spot at which the amount of received light is maximum, on the basis of the received-light spot detected by said received-light-spot detection means;

an object detection means for determining the presence or absence of said target object on the basis of the number of said received-light spots determined by said number-of-spots determination means and outputting detection signals indicative of the result of the determination of the presence or absence of said target object;

an amount-of-displacement calculation means for calculating the amount of displacement of said target object, on the basis of the one-dimensional position of said received-light spot determined by said spot-position determination means; and a mode switching means for manually switching between a sensor mode in which said detection signals are outputted on the basis of the position of a reference point specified manually and a measurement mode in which the result of the calculation by said amount-of-displacement calculation means is output on the basis of a threshold value defined between two reference points specified manually.

9. The optical displacement measurement device according to claim 8, wherein said spot-position determination means determines the width of the received-light spot on the basis of the outputs of the respective light reception elements, and said amount-of-displacement calculation means calculates the amount of displacement, when the number of received-light spots is one and the width of the received-light spot falls within a predetermined range.

10. The optical displacement measurement device according to claim 8, comprising an amount-of-displacement storage means for storing the amount of displacement calculated by said amount-of-displacement calculation means, and an amount-of-displacement updating means for selecting one from a group of the amount of displacement calculated by said amount-of-displacement calculation means and the amount of displacement read from said amount-of-displacement storage means, on the basis of the number of said received-light spots determined by said number-of-spots determination means, and rewriting the content of said amount-of-displacement storage means, when a result of detection of a received-light spot is newly obtained.

11. The optical displacement measurement device according to claim 8, comprising a reference-point specification means for specifying said reference point(s) on the basis of user's operations, and a reference-specification invalidation means for invalidating the reference point(s) specified by said reference-point specification means, when two or more received-light spots exist.

12. An optical displacement sensor comprising:

a light projection unit for directing projected light to a target object;

a light reception unit comprising two or more light reception elements arranged in a linear shape for receiving light reflected by said target object out of said projected light and outputting signals corresponding to the amount of received light;

a device for detecting a received-light spot on said light reception unit, on the basis of the outputs of said respective light reception elements; determining the number of said received-light spots, on the basis of the detected received-light spot;

determining a one-dimensional position of said received-light spot corresponding to an amount of displacement of said target object on the basis of the result of the detection by said device for detecting said received-light-spot;

determining the presence or absence of said target object on the basis of the determined number of said received-light spots and the one-dimensional position of said received-light spot determined by said spot-position determination unit; and outputting detection signals indicative of the result of the determination of the presence or absence of said target object.

* * * * *